(12) United States Patent
Zhou et al.

(10) Patent No.: US 12,254,522 B2
(45) Date of Patent: Mar. 18, 2025

(54) CONTRACT RECOMMENDATION PLATFORM

(71) Applicant: Accenture Global Solutions Limited, Dublin (IE)

(72) Inventors: Lijuan Marissa Zhou, Dublin (IE); Qirun Chen, Dublin (IE); Tianhua Hu, Dalian (CN); Mark Dineen, Dublin (IE); Stephen Redmond, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 165 days.

(21) Appl. No.: 17/217,504

(22) Filed: Mar. 30, 2021

(65) Prior Publication Data

US 2021/0366065 A1   Nov. 25, 2021

(30) Foreign Application Priority Data

May 20, 2020 (WO) ................ PCT/CN2020/091320

(51) Int. Cl.
*G06Q 50/18* (2012.01)
*G06F 16/338* (2019.01)
(Continued)

(52) U.S. Cl.
CPC ......... *G06Q 50/188* (2013.01); *G06F 16/338* (2019.01); *G06F 40/166* (2020.01); *G06Q 10/067* (2013.01)

(58) Field of Classification Search
CPC .. G06Q 50/188; G06Q 10/067; G06F 16/338; G06F 40/166
(Continued)

(56) References Cited

U.S. PATENT DOCUMENTS

2010/0268528 A1* 10/2010 Raskina ................ G06F 40/284
715/256
2019/0005012 A1   1/2019 Priestas et al.
(Continued)

FOREIGN PATENT DOCUMENTS

CN   111985881 A1 *  5/2019  ........... G06Q 10/103
CN   109933768 A      6/2019
(Continued)

OTHER PUBLICATIONS

International Search Report and Written Opinion for International Application No. PCT/CN2020/091320, mailed on Feb. 23, 2021, 9 pages.
(Continued)

*Primary Examiner* — Maikhanh Nguyen
(74) *Attorney, Agent, or Firm* — Polsinelli PC

(57) ABSTRACT

A contract platform may receive, from data structures, historical contract data; read, from the historical contract data, numerical categorical data; process the numerical categorical data, with one or more artificial intelligence models, to convert the numerical categorical data into vector format; generate a taxonomy in vector format based on the converted numerical categorical data; read, from the historical contract data, nonnumerical noncategorical data; process the nonnumerical noncategorical data, with the models, to convert the nonnumerical noncategorical data into vector format; generate a knowledge graph in vector format based on the converted nonnumerical noncategorical data. The contract platform may receive a request that includes data identifying a new contract to be created; identify, in the taxonomy and in the knowledge graph, similar contracts; determine similarity scores between the data identifying the new contract and data identifying the similar contracts; and provide the similarity scores and the similar contracts.

20 Claims, 24 Drawing Sheets

(51) Int. Cl.
*G06F 40/166* (2020.01)
*G06Q 10/067* (2023.01)

(58) Field of Classification Search
USPC .......................................................... 705/80
See application file for complete search history.

(56) References Cited

U.S. PATENT DOCUMENTS

| | | | |
|---|---|---|---|
| 2019/0171438 A1 | 6/2019 | Franchitti | |
| 2019/0266196 A1 | 8/2019 | Boyce et al. | |
| 2021/0182990 A1* | 6/2021 | Vidhani | G06Q 40/04 |
| 2021/0304044 A1* | 9/2021 | Nagarajan | G06N 7/01 |

FOREIGN PATENT DOCUMENTS

| | | | | |
|---|---|---|---|---|
| CN | 110765889 A | 2/2020 | | |
| CN | 111160345 A | 5/2020 | | |
| WO | WO-2020110664 A1 * | 6/2020 | | G06N 20/00 |

OTHER PUBLICATIONS

Extended European Search Report for Application No. EP209369164 mailed on Jan. 26, 2024, 09 pages.

* cited by examiner

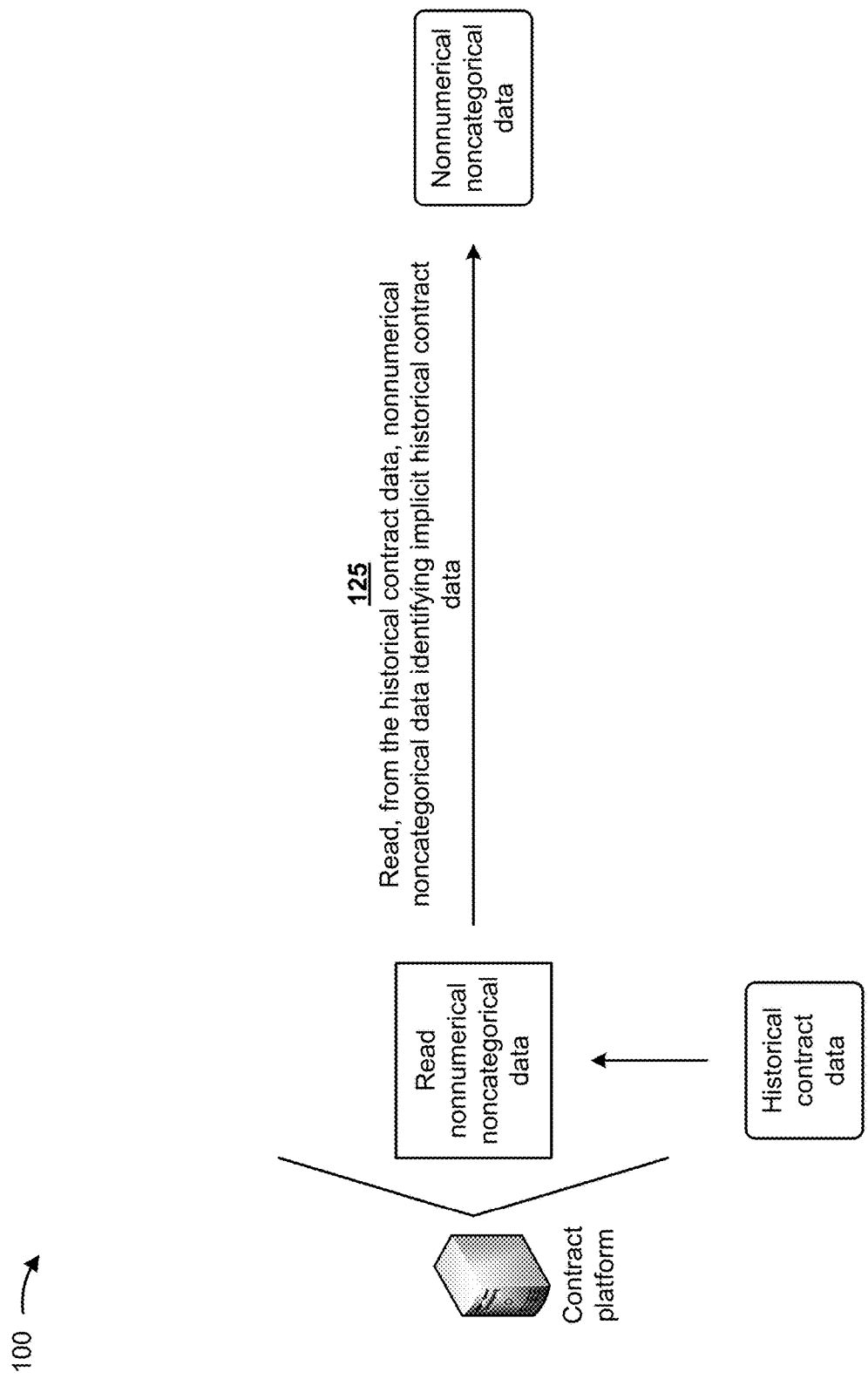

CONTRACT RECOMMENDATION PLATFORM

CROSS-REFERENCE TO RELATED APPLICATION

This application claims priority to Patent Cooperation Treaty (PCT) Application No. PCT/CN2020/091320, filed May 20, 2020, the contents of which are incorporated by reference herein.

BACKGROUND

A contract is a legally binding agreement between two or more parties. An entity may be involved in numerous contracts and may store information regarding such contracts (e.g., data included in such contracts) in multiple data structures. In some instances, when generating a new contract, the entity may search the data structures to identify one or more previous contracts similar to the new contract and use data, from such previous contracts, to generate the new contract.

SUMMARY

According to some implementations, a method may include receiving, by a device, historical contract data; reading, by the device and from the historical contract data, numerical categorical data identifying explicit historical contract data; processing, by the device, the numerical categorical data, with one or more artificial intelligence models, to convert the numerical categorical data into vector format; creating, by the device, a taxonomy in vector format based on the numerical categorical data in vector format; reading, by the device and from the historical contract data, nonnumerical noncategorical data identifying implicit historical contract data; processing, by the device, the nonnumerical noncategorical data, with one or more artificial intelligence models, to convert the nonnumerical noncategorical data into vector format; creating, by the device, a knowledge graph in vector format based on the nonnumerical noncategorical data in vector format; receiving, by the device and from a client device, a request that includes data identifying a new contract to be created; identifying, by the device and in the taxonomy, a first set of similar contracts that include data similar to the data identifying the new contract; identifying, by the device and in the knowledge graph, a second set of similar contracts that include data similar to the data identifying the new contract; determining, by the device, similarity scores between the data identifying the new contract and data identifying the first set of similar contracts and between the data identifying the new contract and data identifying the second set of similar contracts; and providing, by the device and to the client device, the similarity scores, the data identifying the first set of similar contracts, and the data identifying the second set of similar contracts.

According to some implementations, a device may include one or more memories and one or more processors. In some implementations, the one or more processors are communicatively coupled to the one or more memories. The one or more processors may be configured to: receive, from an internal data structure and an external data structure, historical contract data identifying one or more of historical contracts, historical contract terms, or personnel involved in the historical contracts; read, from the historical contract data, numerical categorical data identifying explicit historical contract data; process the numerical categorical data, with one or more artificial intelligence models, to convert the numerical categorical data into vector format; generate a taxonomy in vector format based on the numerical categorical data in vector format; read, from the historical contract data, nonnumerical noncategorical data identifying implicit historical contract data; process the nonnumerical noncategorical data, with the one or more artificial intelligence models, to convert the nonnumerical noncategorical data into vector format; generate a knowledge graph in vector format based on the nonnumerical noncategorical data in vector format; receive, from a client device, a request that includes data identifying a new contract to be created; identify, in the taxonomy and in the knowledge graph, a set of similar contracts that include data similar to the data identifying the new contract; determine similarity scores between the data identifying the new contract and data identifying the set of similar contracts; and provide, to the client device, the similarity scores and the data identifying the set of similar contracts.

According to some implementations, a non-transitory computer-readable medium may store one or more instructions. The one or more instructions, when executed by one or more processors, may cause the one or more processors to: receive, from a client device, a request that includes data identifying a new contract to be created; identify, in a taxonomy, a first set of similar contracts that include data similar to the data identifying to the new contract, wherein the taxonomy is generated based on: reading numerical categorical data from historical contract data, and processing the numerical categorical data with one or more artificial intelligence models; identify, in a knowledge graph, a second set of similar contracts that include data similar to the data identifying the new contract, wherein the knowledge graph is generated based on: reading nonnumerical noncategorical data from the historical contract data, and processing the nonnumerical noncategorical data with the one or more artificial intelligence models; determine similarity scores between the data identifying the new contract and data identifying the first set of similar contracts and between the data identifying the new contract and data identifying the second set of similar contracts; provide, to the client device, the similarity scores, the data identifying the first set of similar contracts, and the data identifying the second set of similar contracts; receive, from the client device, feedback data associated with the similarity scores, the data identifying the first set of similar contracts, or the data identifying the second set of similar contracts; determine weights for the similarity scores based on the feedback data; calculate final similarity scores between the new contract and the first set of similar contracts and between the new contract and the second set of similar contracts, based on the weights and the similarity scores; and perform one or more actions based on the final similarity scores.

DETAILED DESCRIPTION

Figure 1A:
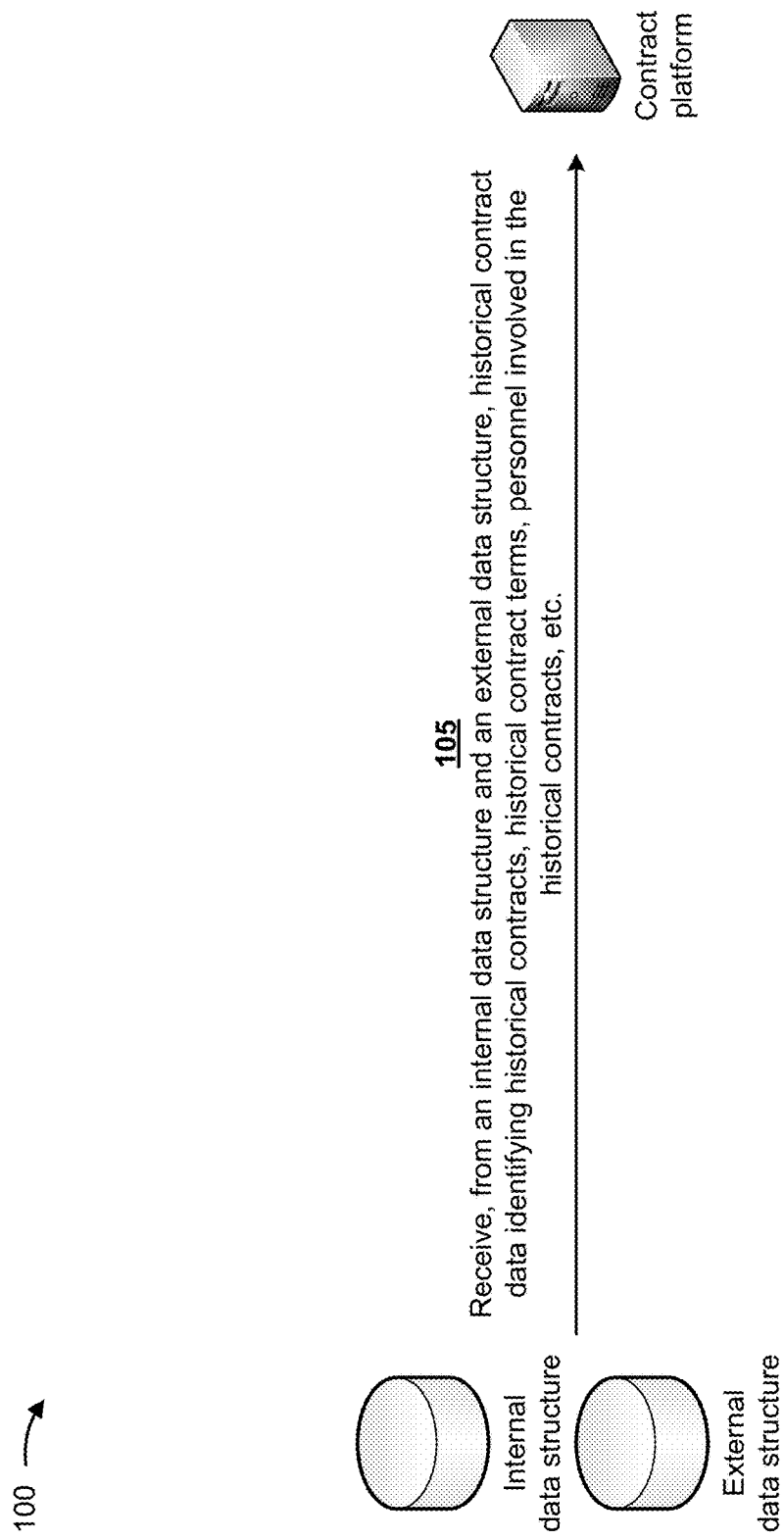
FIGS. 1A-1Q are diagrams of an example implementation described herein.

The following detailed description of example implementations refers to the accompanying drawings. The same reference numbers in different drawings may identify the same or similar elements.

An entity may be involved in and/or be associated with hundreds, thousands, or millions of contracts that are associated with hundreds, thousands, or millions of parties. Information regarding such contracts (e.g., data identifying parties, terms, conditions, pricing information, and/or the like) may be stored in multiple data structures. In this regard, when generating a new contract, the entity may use computing resources, networking resources, and/or the like to search the data structures to identify one or more previous contracts similar to the new contract and to determine relevant data (e.g., terms, conditions, pricing information, and/or the like), from the one or more previous contracts, to include in the new contract. Prior techniques for searching data structures to identify contracts and determine relevant data from the contracts are challenging, time consuming, cumbersome, tedious, and dependent on manual intervention.

For example, the search strategy (e.g., search queries and/or search terms), for searching the data structures, may not be efficient or effective. As a result, numerous search queries may be generated and executed on multiple data structures in order to identify the contracts. In some instances, search queries, with slight variations, may be executed multiple times on the same data structure. The execution of numerous search queries on multiple data structures consumes computing resources, networking resources, and/or the like.

Additionally, when the contracts are identified, the entity may use computing resources, networking resources, and/or the like to analyze the contracts (e.g., data comparison with information regarding the new contract) to determine the relevant data (e.g., terms, conditions, pricing information, and/or the like). Such analysis of the contracts is challenging and time consuming, especially when the quantity of the contracts is numerous and/or when the contracts involve complex transactions between the parties of the contracts (e.g., complex terms, conditions, pricing information, and/or the like). Accordingly, such analysis of the contracts consumes computing resources, networking resources, and/or the like.

Some implementations described herein provide a contract platform that automatically and efficiently identifies existing contracts that include contract data similar to data regarding a new contract to be generated and provide data identifying the existing contracts (including the contract data) as a recommendation for use in generating the new contract. For example, the contract platform may receive, from an internal data structure and an external data structure, historical contract data identifying one or more of historical contracts, historical contract terms, or personnel involved in the historical contracts. The contract platform may read, from the historical contract data, numerical categorical data identifying explicit historical contract data and process the numerical categorical data, with one or more artificial intelligence models, to convert the numerical categorical data into vector format. The contract platform may create a taxonomy in vector format based on the numerical categorical data in vector format and read, from the historical contract data, nonnumerical noncategorical data identifying implicit historical contract data. The contract platform may process the nonnumerical noncategorical data, with the one or more artificial intelligence models, to convert the nonnumerical noncategorical data into vector format and create a knowledge graph in vector format based on the nonnumerical noncategorical data in vector format.

The contract platform may receive, from a client device, a request that includes data identifying a new contract to be created. The contract platform may identify, in the taxonomy, a first set of similar contracts that include data similar to the data identifying the new contract and identify, in the knowledge graph, a second set of similar contracts that include data similar to the data identifying the new contract. The contract platform may determine similarity scores between the data identifying the new contract and data identifying the first set of similar contracts and between the data identifying the new contract and data identifying the second set of similar contracts. The contract platform may provide, to the client device, the similarity scores, the data identifying the first set of similar contracts, and the data identifying the second set of similar contracts. The contract platform may provide data, from the first set of similar contracts and/or the second set of similar contracts, that may be used to generate the new contract.

In this way, the contract platform may use the taxonomy and the knowledge graph to more efficiently and more effectively identify existing contracts to be used in generating a new contract. Accordingly, using the contract platform conserves computing resources (e.g., processing resources, memory resources, communication resources, and/or the like), networking resources, and/or the like associated with identifying contracts that would have otherwise been used to generate and execute numerous search queries in order to identify prior contracts (as explained with respect to the prior techniques discussed above). Additionally, using the contract platform conserves computing resources (e.g., processing resources, memory resources, communication resources, and/or the like), networking resources, and/or the like that would have otherwise been used to analyze such prior contracts (as explained with respect to the prior techniques discussed above).

Figure 1B:
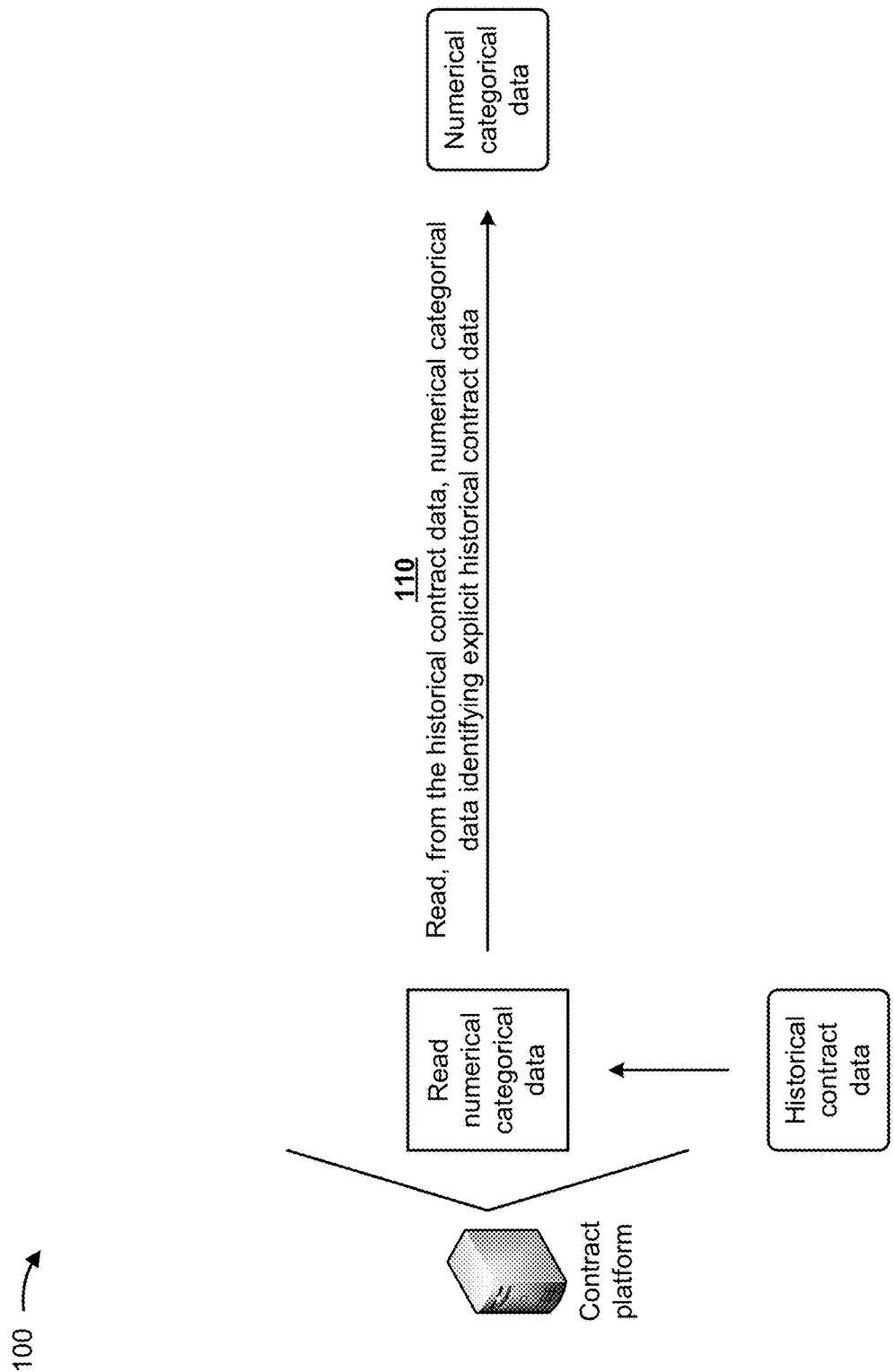
Figure 1C:
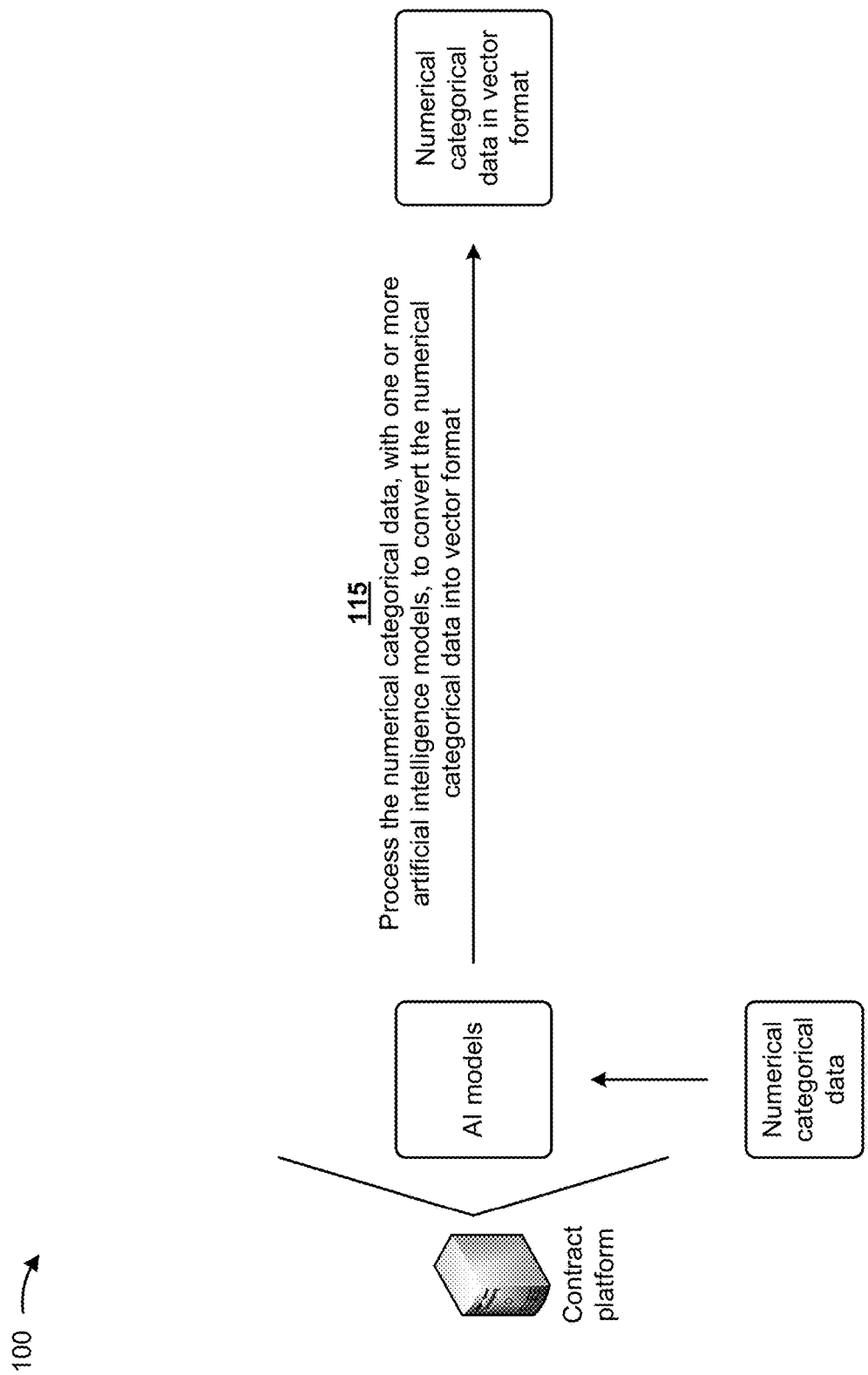
Figure 1D:
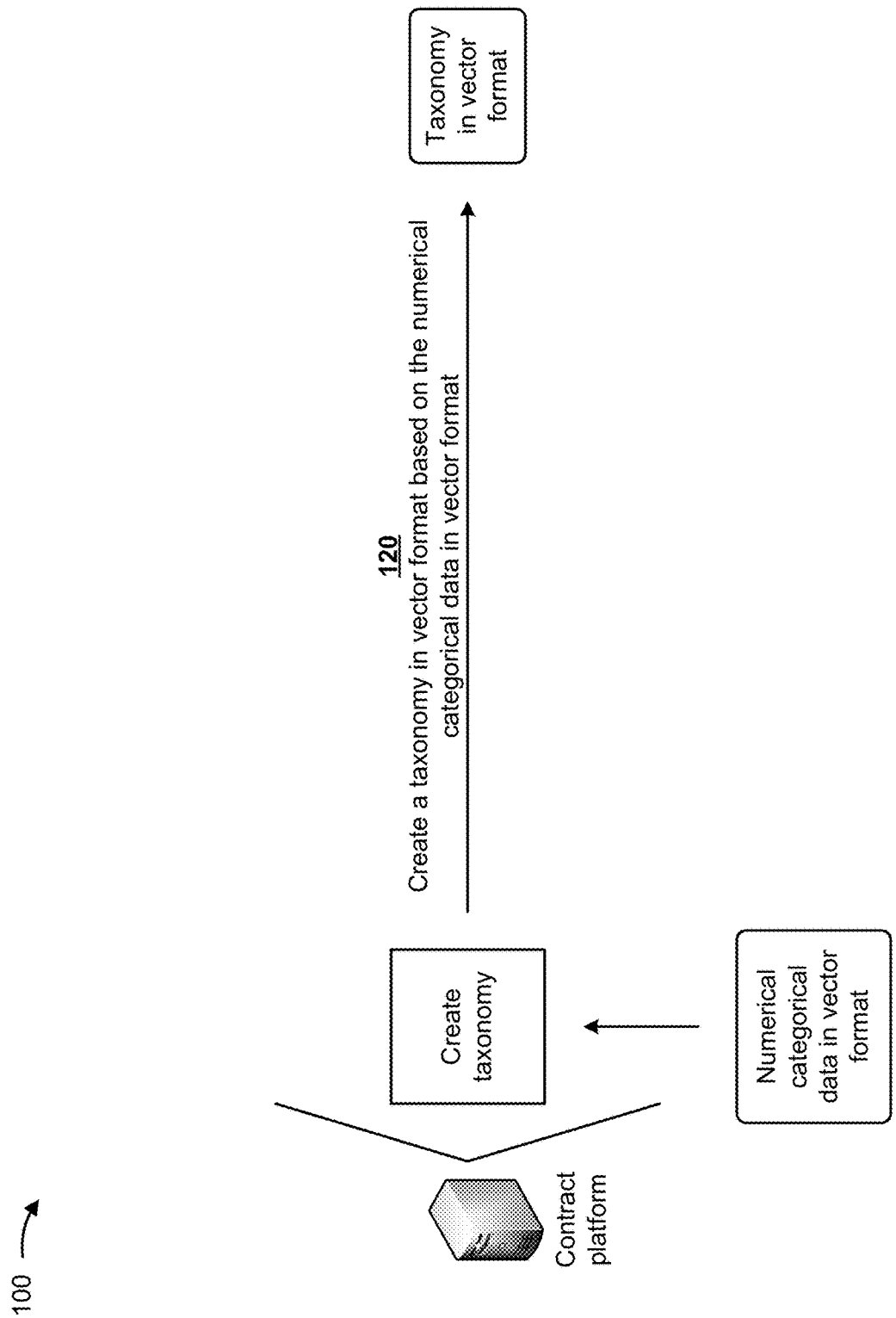
Figure 1F:
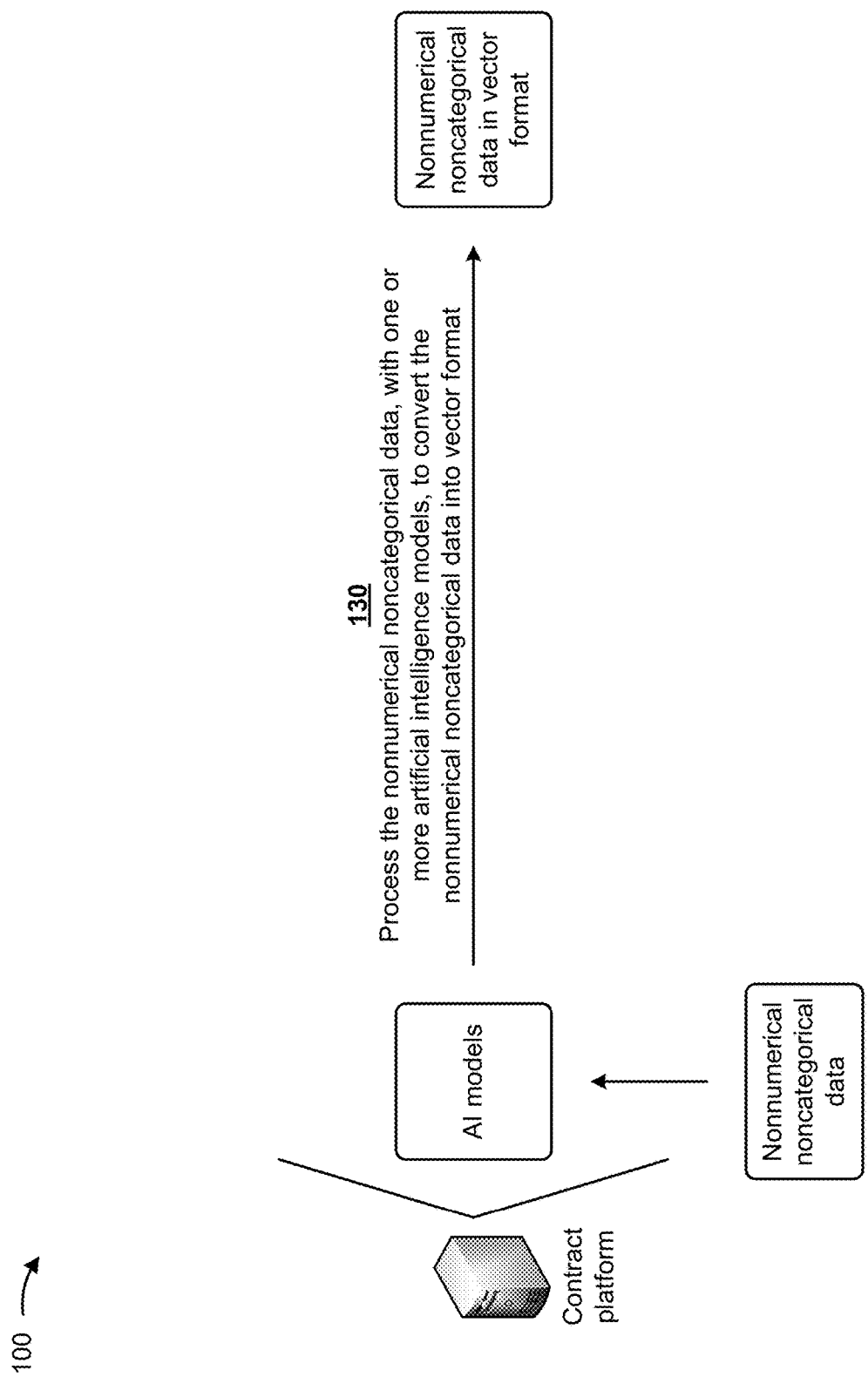
Figure 1G:
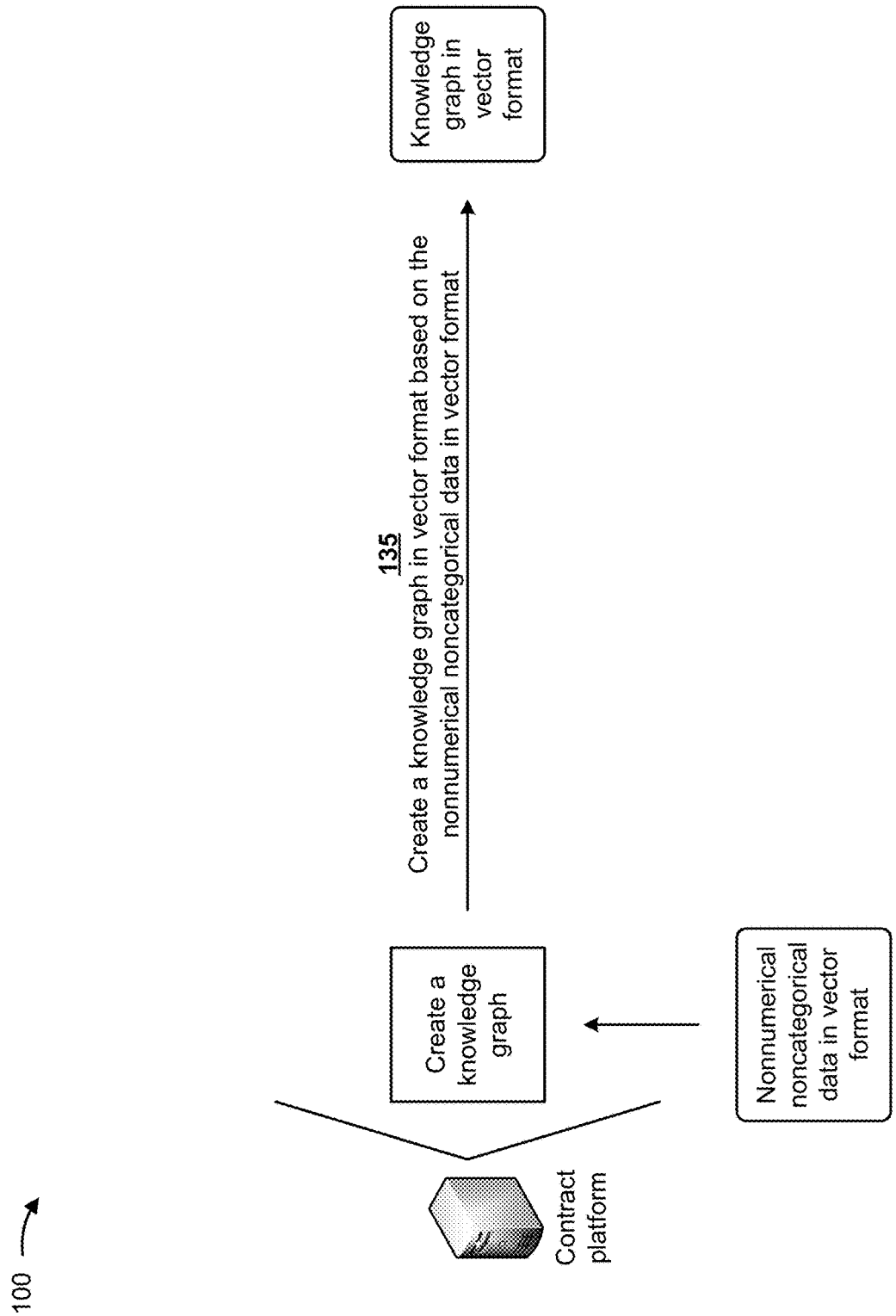
Figure 1H:
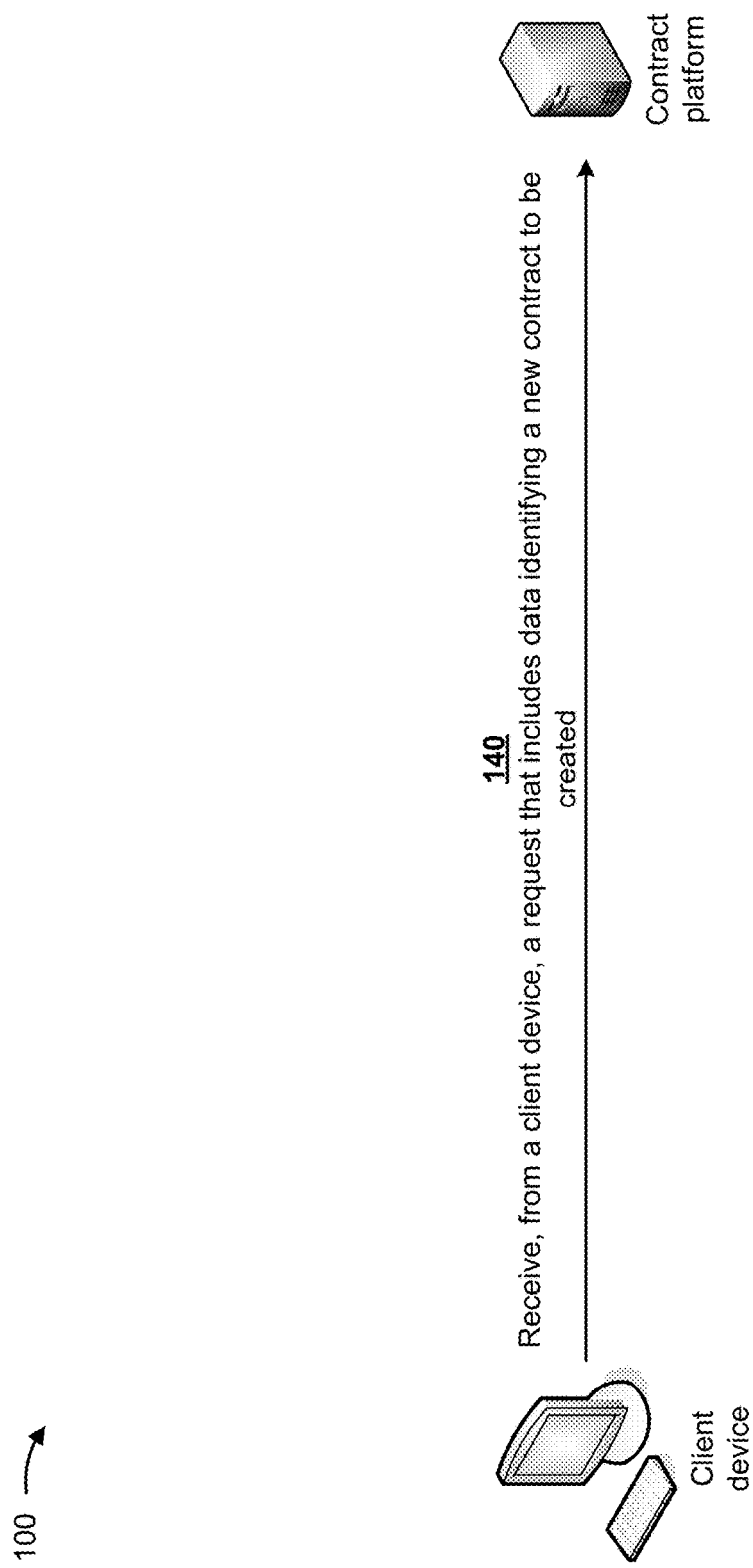
Figure 1I:
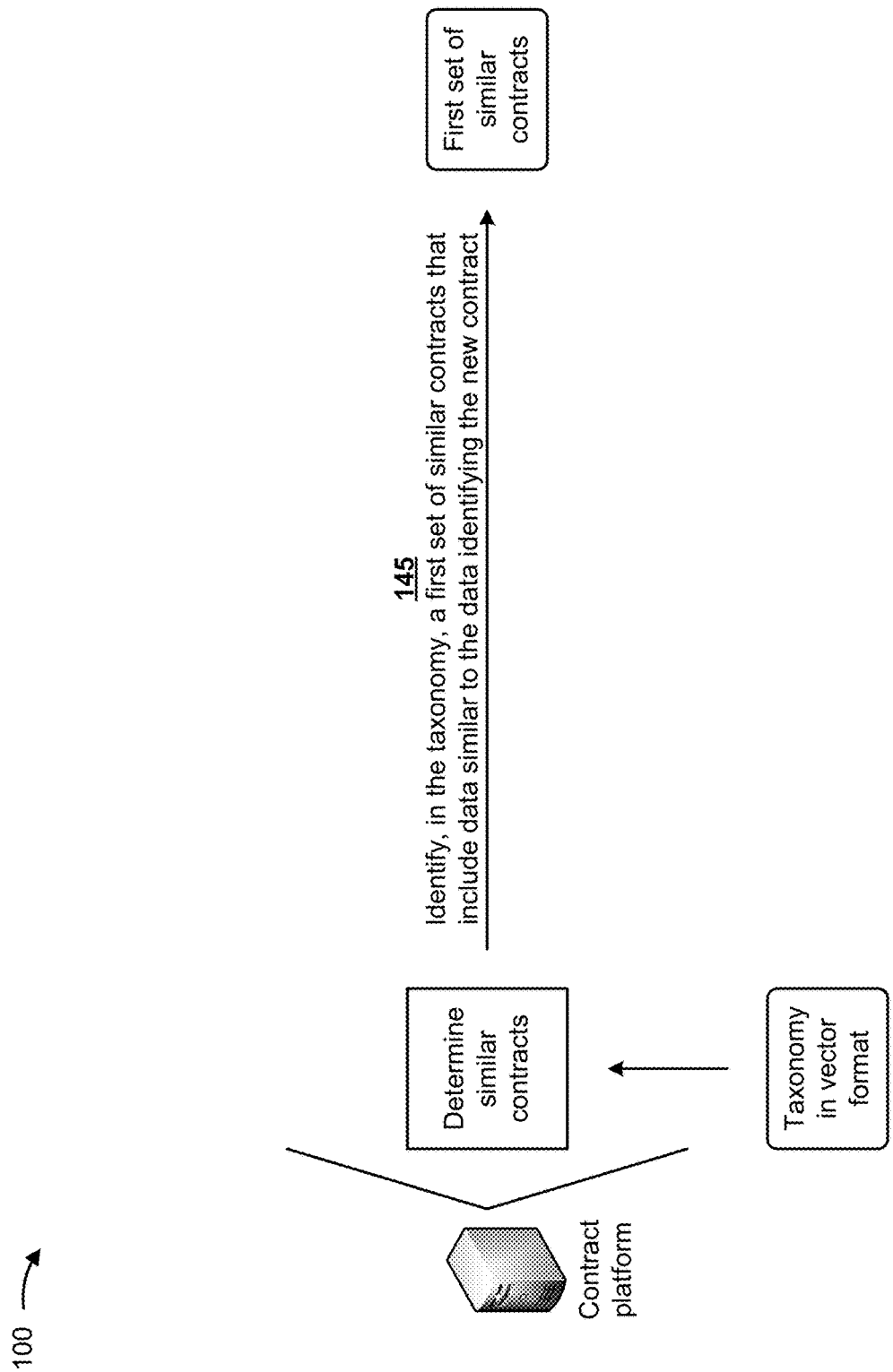
Figure 1J:
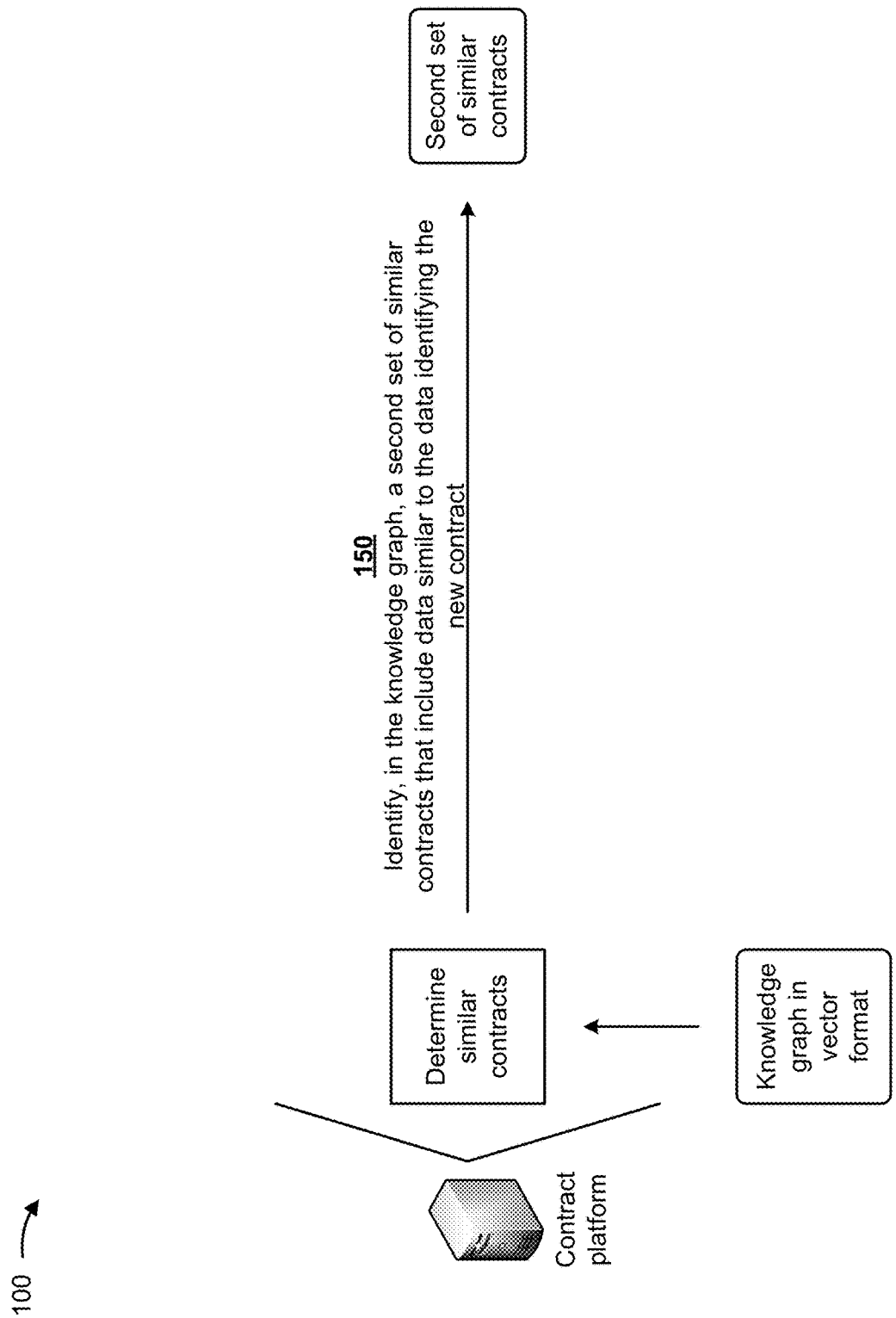
Figure 1K:
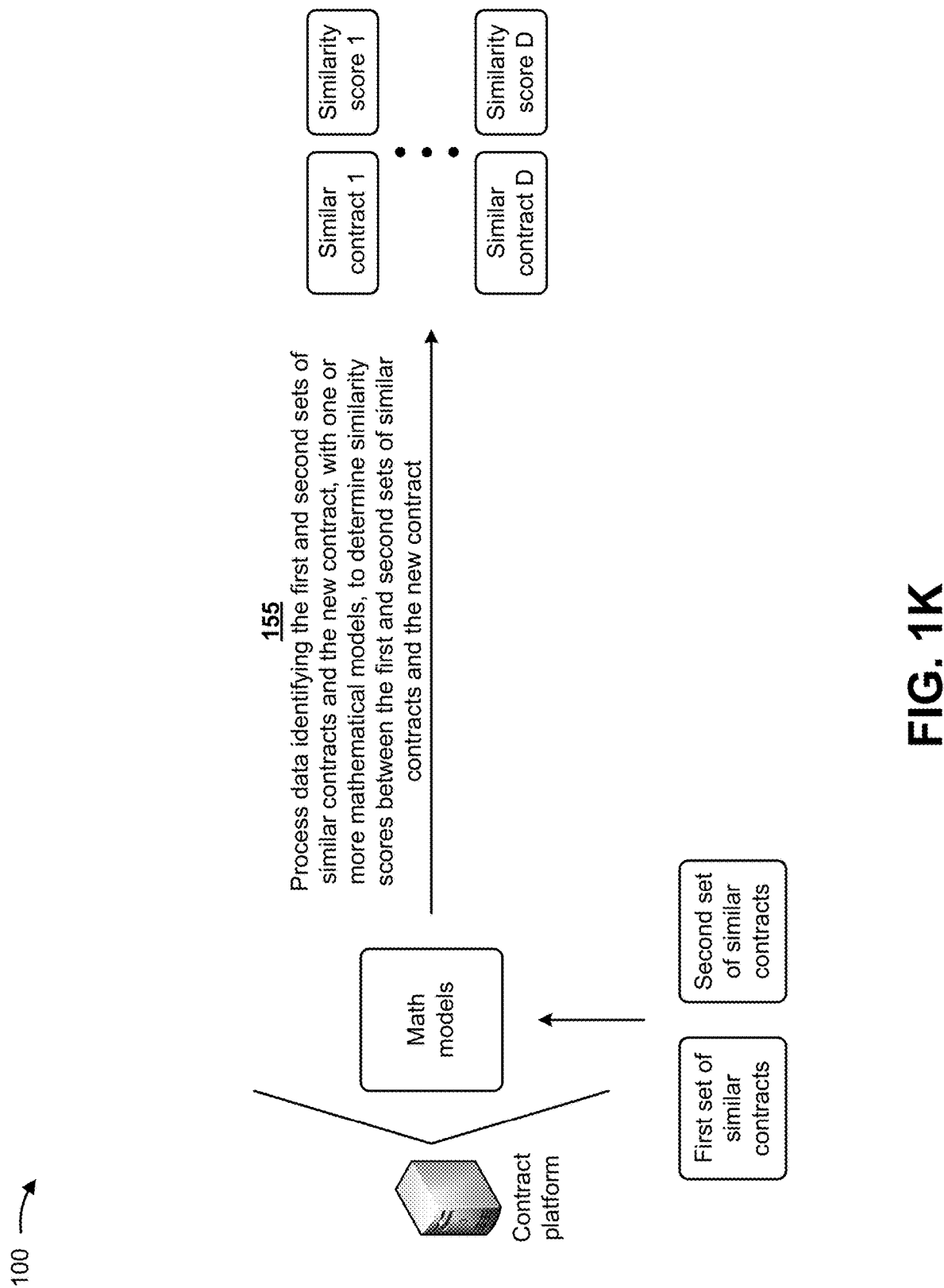
Figure 1L:
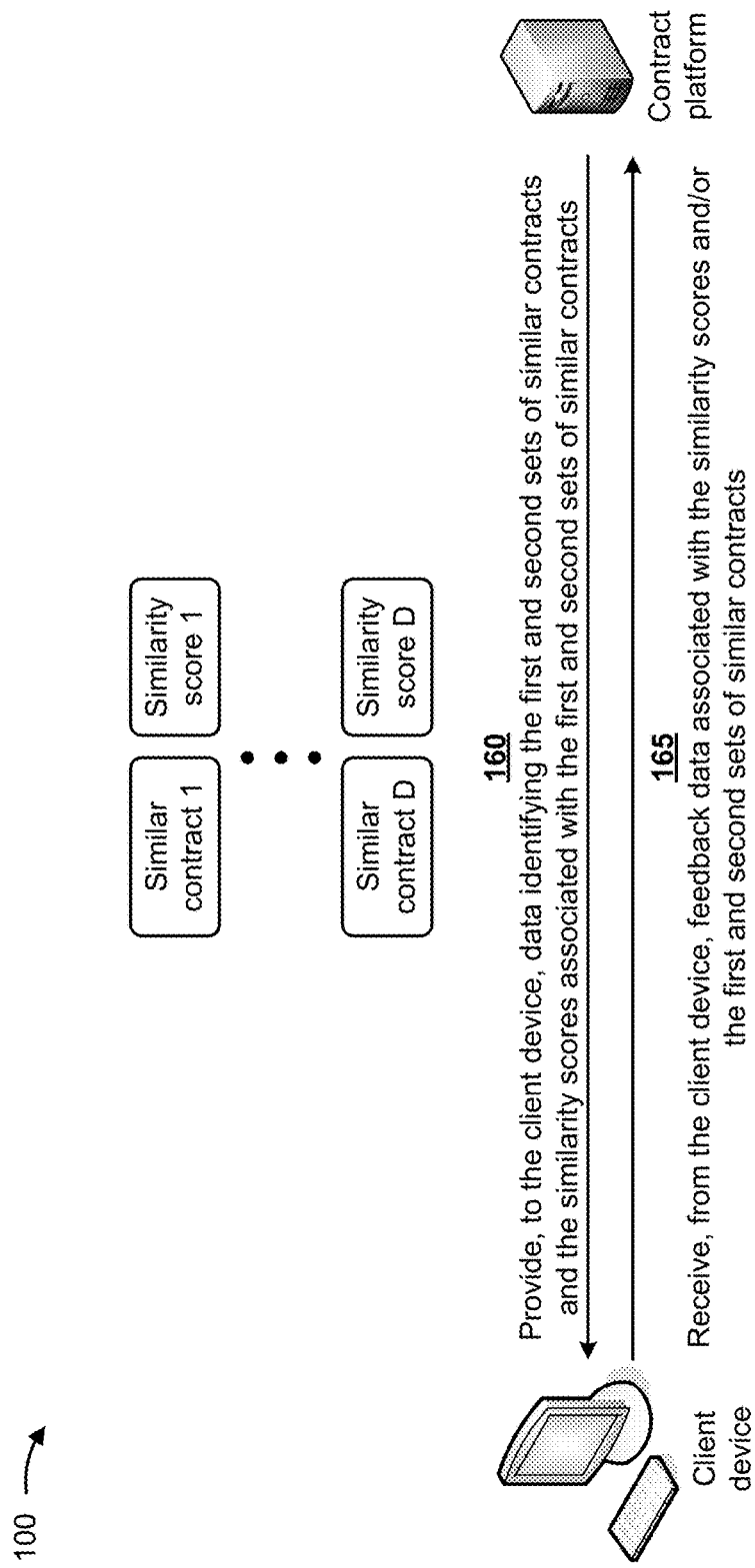
Figure 1M:
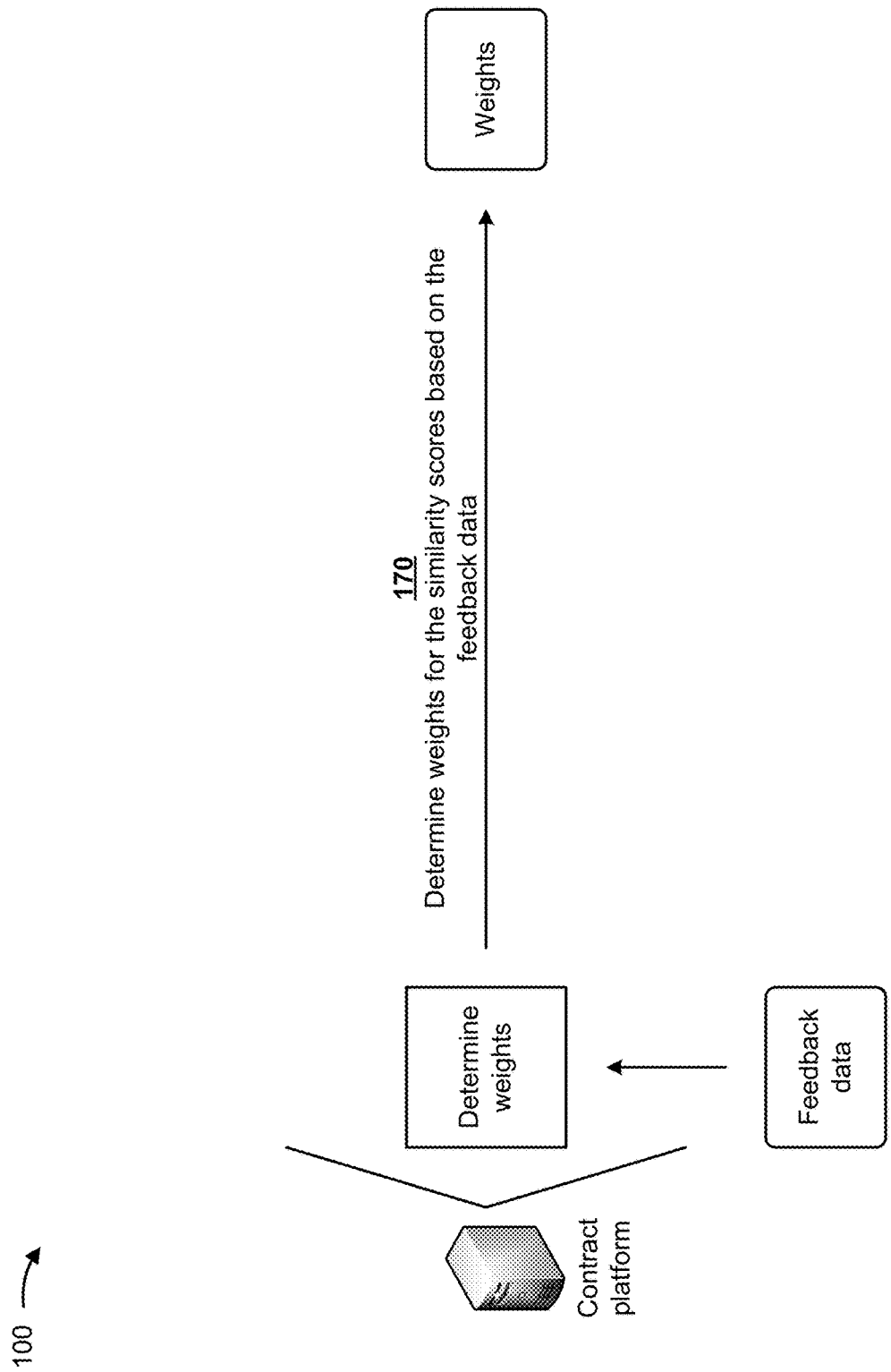
Figure 1N:
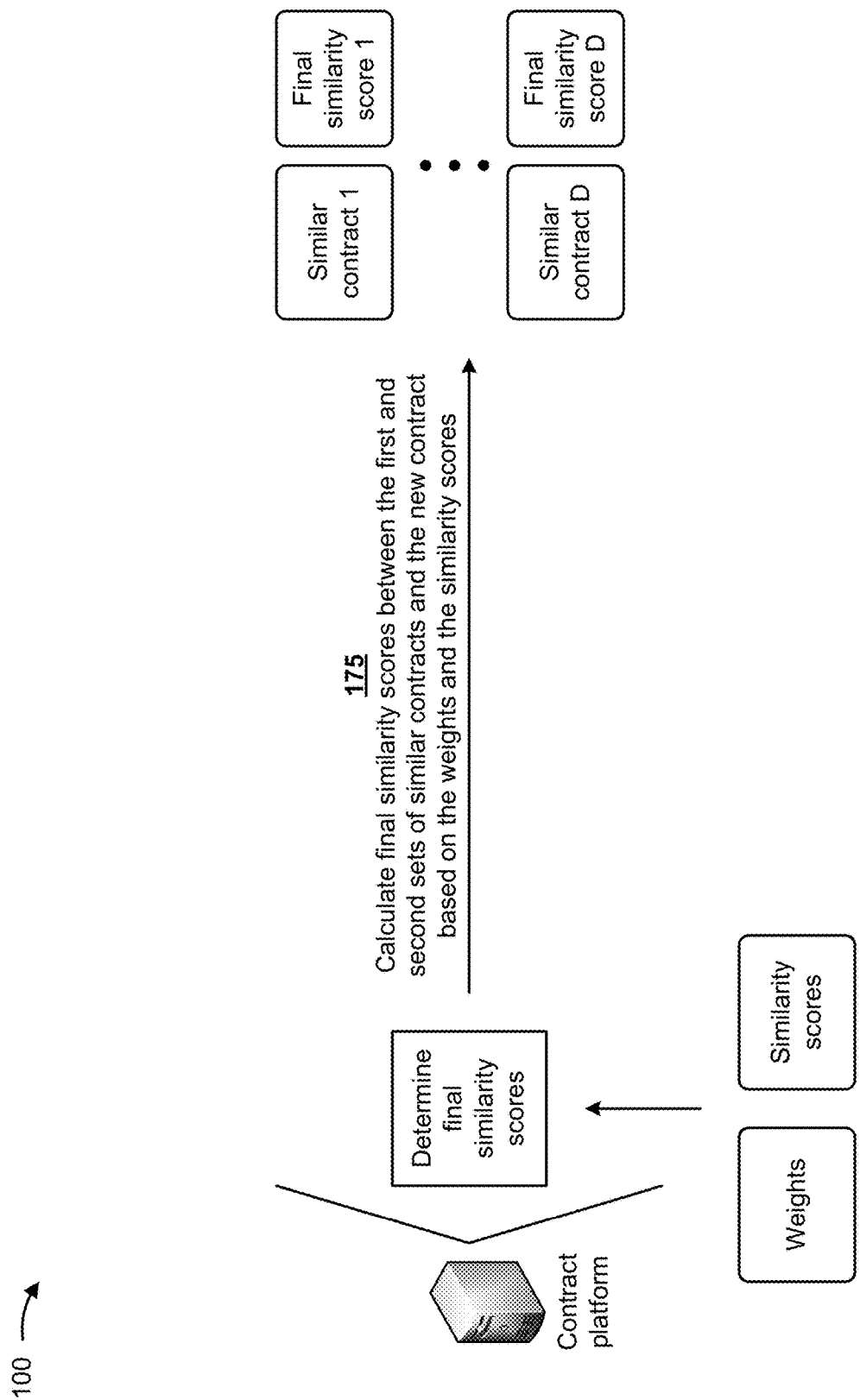
Figure 10:
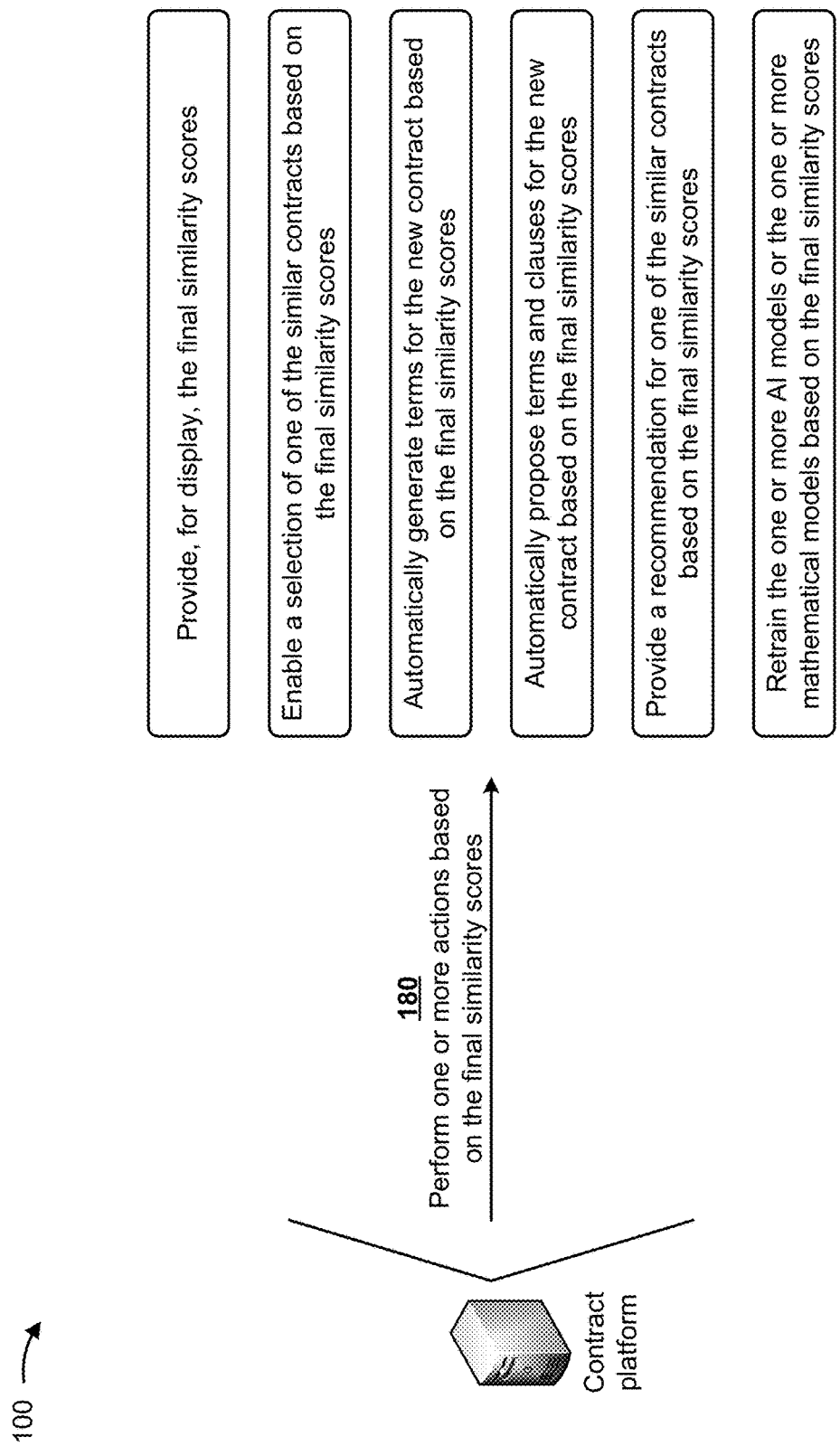
Figure 1P:
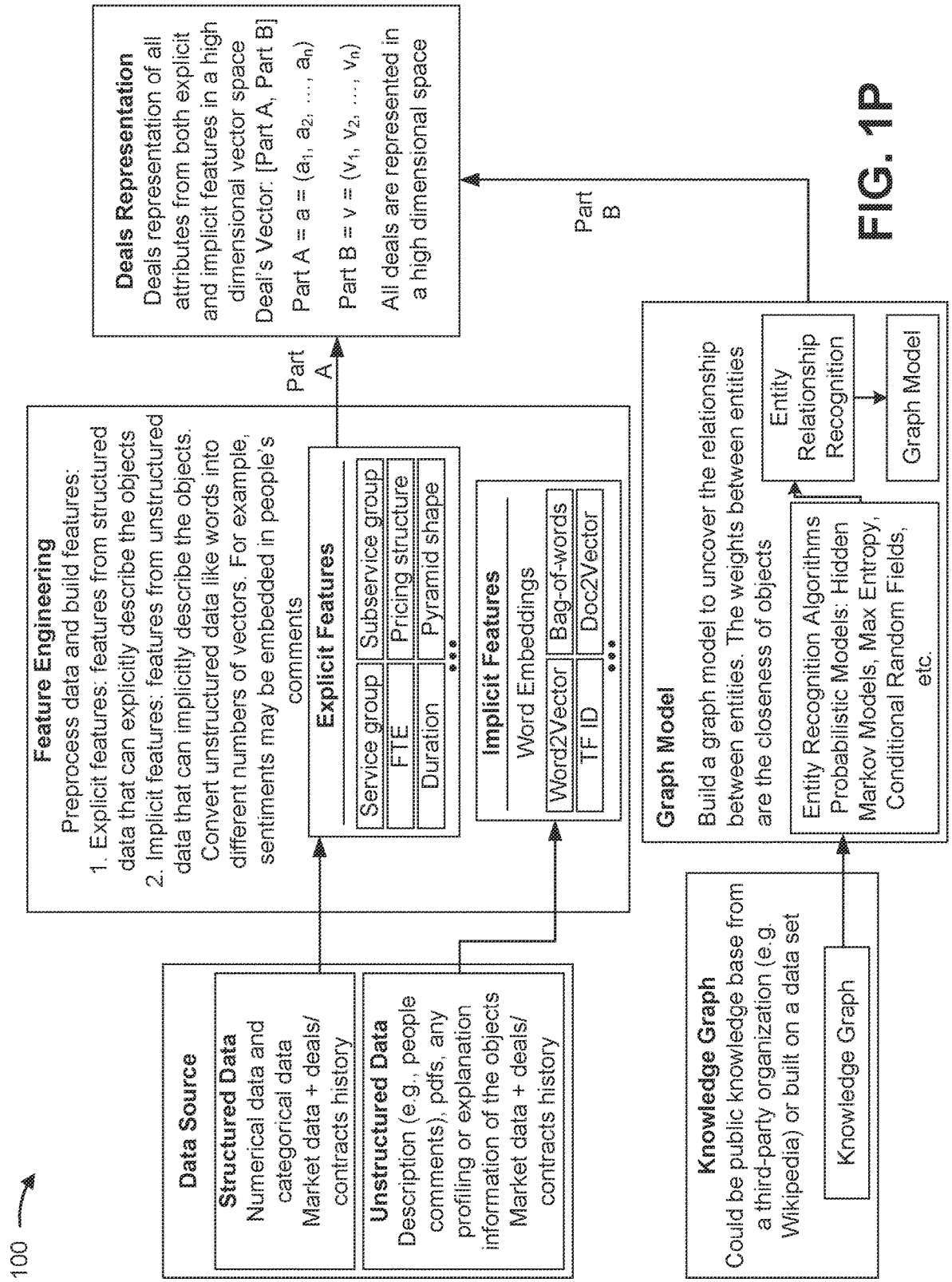
Figure 1Q:
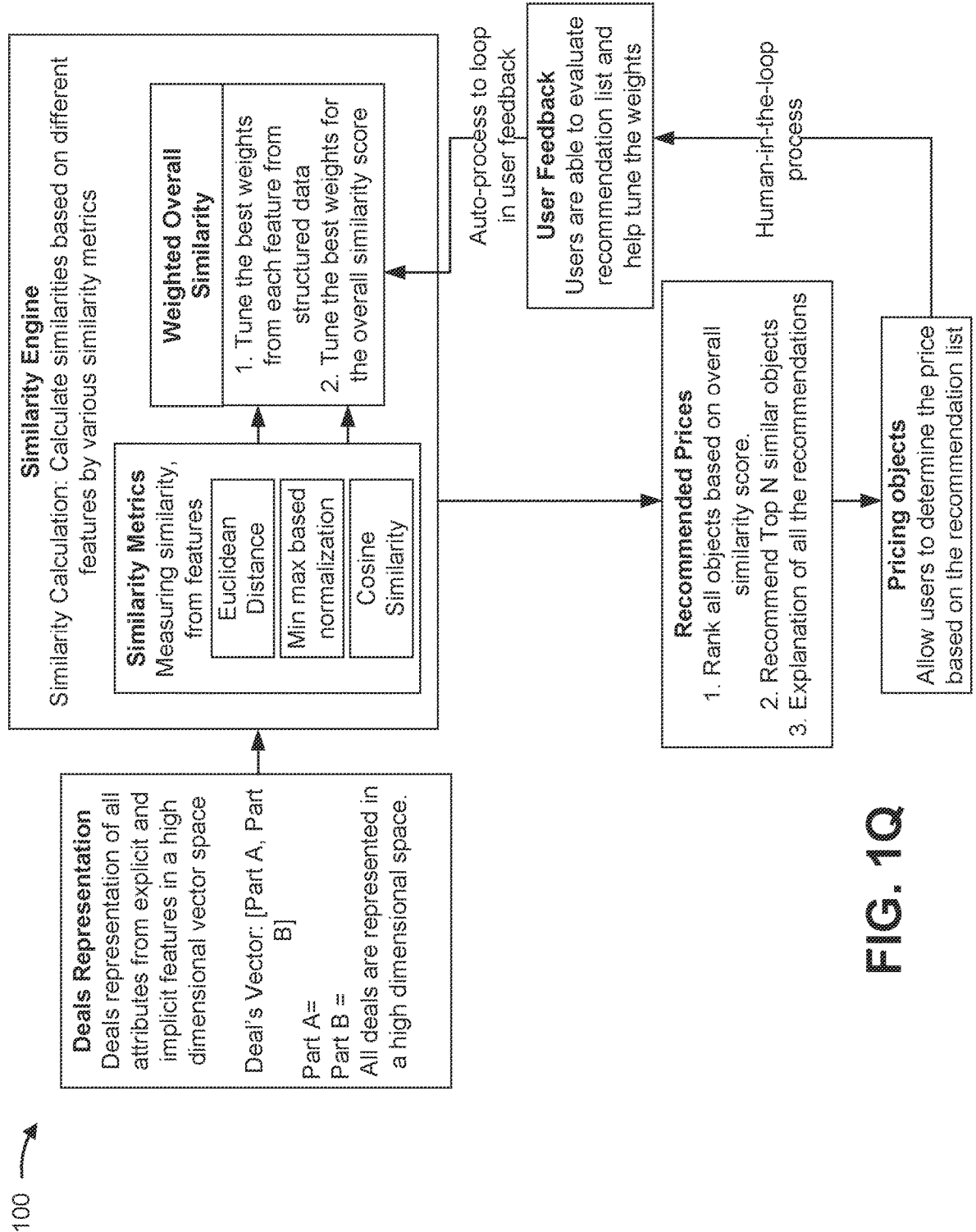

FIGS. 1A-1Q are diagrams of an example implementation 100 described herein. As shown in FIGS. 1A-1Q, example implementation 100 includes a contract platform, an internal data structure, an external data structure, and a client device. The contract platform, the internal data structure, the external data structure, and the client device are further described below in connection with FIGS. 4 and 5.

The contract platform may be hosted by a cloud computing environment or by one or more server devices, and may be associated with one or more client devices and/or data structures (e.g., including the client device, the internal data structure, the external data structure discussed above). The internal data structure may include a data structure (e.g., a data warehouse, a database engine, a data repository, a data center, a cloud computing resource, and/or the like) that stores historical contract data of an entity (e.g., that uses the contract platform to generate new contracts). The external data structure may include a data structure (e.g., a data warehouse, a database engine, a data repository, a data center, a cloud computing resource, and/or the like) that stores historical contract data of one or more entities different than the entity. The client device may include a mobile device, a computer, and/or the like.

As shown in FIG. 1A, and by reference number 105, the contract platform may receive, from the internal data structure and from the external data structure, historical contract data. In some implementations, the contract platform may obtain the historical contract data from the internal data structure and from the external data structure based on a request, from the client device, associated with generating a new contract, as will be described in more detail below. Alternatively, the contract platform may obtain the historical contract data independently of receiving any request associated with generating new contracts.

The historical contract data may include data identifying historical contracts, historical contract terms, historical contract conditions, historical contract clauses, personnel involved in the historical contracts, entities associated with the historical contracts, and/or the like. The data items listed above are intended as examples of historical contract data that may be included in the internal data structure and/or the external data structure. In practice, the historical contract data may include one or more of the data items listed above and/or one or more other data items that are not listed above.

The historical contract data received from the internal data structure may be structured data. For example, the historical contract data may be stored, in the internal data structure, in a structured format (e.g., with a predefined structure or organized in a predefined manner). The structured data may include data that explicitly describes the historical contracts (e.g., explicit features, as described below) such as, for example, data that may be included in the historical contracts or included in documents related to the historical contracts. The historical contract data received from the external data structure may be unstructured data. For example, the historical contract data may be stored, in the external data structure, in an unstructured format (e.g., with an undefined structure or not organized in a predefined manner) or in a format that is different from the structured format. The unstructured data may include data that implicitly describes the historical contracts and/or that provides background information regarding the historical contracts (e.g., implicit features, as described below).

As shown in FIG. 1B, and by reference number 110, the contract platform may read, from the historical contract data, numerical categorical data identifying explicit historical contract data. For example, after receiving the historical contract data from the internal data structure, the contract platform may analyze the historical contract data to identify numerical data and categorical data in the historical contract data. The contract platform may read the numerical data and the categorical data from the historical contract data as a result of analyzing the historical contract data. The numerical data and the categorical data may be included in the numerical categorical data and may identify the explicit historical contract data. The explicit historical contract data may include data that explicitly identifies or describes the historical contracts (e.g., explicit features of the historical contracts). In other words, the contract platform may read the explicit features based on analyzing the historical contract data. The contract platform may process the historical contract data, with a feature engineering technique, to read the explicit historical contract data and, thereby, read the explicit features. In some implementations, the contract platform may process the historical contract data using one or more natural language processing techniques to read the numerical categorical data identifying the explicit historical contract data The explicit historical contract data (identified by the numerical data) may identify explicit features such as, for example, a period of performance under the historical contracts, quantity of personnel used to perform the services, cost associated with the period of performance, other pricing information and/or monetary consideration for the historical contracts, and/or the like. The explicit historical contract data (identified by the categorical data) may identify additional explicit features such as, for example, departments, divisions, groups, and/or other organizational structure of the entities involved in the historical contracts, types of personnel involved in the historical contracts (e.g., full time employees, part time employees, contractors, and/or the like), the personnel (e.g., names, identifiers, and/or the like), types of the services, goods involved in the historical contracts, information identify technologies related to the performance (e.g., related to the goods and/or services), and/or the like. The data items listed above are intended as examples of explicit historical contract data (identified by the numerical data and/or the categorical data). In practice, the explicit historical contract data may include one or more of the data items listed above and/or one or more other data items that are not listed above.

In some implementations, the historical contract data (obtained from the internal data structure), may include market data such as, for example, historical annual report data of one or more of the entities involved in the historical contracts, competitive intelligence data regarding historical contracts involving competitors of one or more of the entities, and/or the like.

As shown in FIG. 1C, and by reference number 115, the contract platform may process the numerical categorical data, with one or more artificial intelligence models, to convert the numerical categorical data into vector format. For example, after reading the numerical categorical data, the contract platform may generate vectors for the explicit features of the numerical categorical data. In some implementations, the contract platform may generate a vector of explicit features for each contract of the historical contracts and the vector may include data identifying each explicit feature of the contract. For example, the contract platform may process the numerical categorical data using one or more natural language processing techniques to generate the vectors. For instance, the contract platform may convert the explicit features (from the numerical categorical data), for each historical contract, into vectors using a Word2vector technique, a Doc2vector technique, and/or the like.

In some implementations, each explicit feature may be converted into one or more alphanumeric characters. For example, the contract platform may generate the one or more alphanumeric characters of an explicit feature based on information regarding the explicit feature (e.g., a name, an identifier, a description, and/or the like of the explicit feature).

As an example, the vector of explicit features for a contract may be in a vector format: $a=(a_1, a_2, \ldots, a_n)$, where a represents the contract, $a_1$ represents a first explicit feature of the contract, $a_2$ represents a second explicit feature of the contract, and an represents an nth explicit feature of the contract. The above techniques and vector format are merely provided as examples. Other examples may differ from the above techniques and vector format described herein.

In some implementations, the contract platform may train the one or more artificial intelligence models with historical contract data (e.g., historical data identifying historical numerical categorical data that identifies the explicit features of historical contracts, historical converted data (e.g., data converted from the explicit features of the historical numerical categorical data), historical vector formats of the historical converted data, and/or the like) to convert the numerical categorical data into vector format.

The contract platform may train the one or more artificial intelligence models in a manner similar to the manner described below in connection with FIG. 2. Alternatively, rather than training the one or more artificial intelligence models, the contract platform may obtain the one or more artificial intelligence models from another system or device that trained the one or more artificial intelligence models. In this case, the other system or device may obtain the historical data (e.g., the historical contract data discussed above) for use in training the one or more artificial intelligence models, and may periodically receive additional data that the other system or device may use to retrain or update the one or more artificial intelligence models.

The contract platform may process the numerical categorical data, with the one or more artificial intelligence models, to convert the numerical categorical data into vector format. The contract platform may use the one or more artificial intelligence models to process the numerical categorical data in a manner similar to the manner described below in connection with FIG. 3.

As shown in FIG. 1D, and by reference number 120, the contract platform may create a taxonomy in vector format based on the numerical categorical data in the vector format. For example, after converting the numerical categorical data into vector format, the contract platform may generate a taxonomy that includes the vectors generated for each contract of the historical contracts (included in the historical contract data). In some implementations, the contract platform may store the taxonomy in one or more memories (or data storage devices) associated with the contract platform. The above taxonomy and format are merely provided as an example. Other examples may differ from the above taxonomy and format described herein.

Using the contract platform and the taxonomy that includes the generated vectors reduces the amount of time that would have taken a user to analyze an entirety of the historical contracts to identify one or more of the historical contracts that are similar to a new contract to be generated, thereby preserving computing resources (e.g., processing resources, memory resources, communication resources, and/or the like), networking resources, and/or the like that would have otherwise been used to analyze the entirety of each of the historical contracts. Additionally, generating a taxonomy that includes the generated vectors reduces the amount of storage that is used, thereby preserving computing resources (e.g., processing resources, memory resources, communication resources, and/or the like), networking resources, and/or the like that would have otherwise been used to store the entirety of the historical contracts and/or the explicit features.

As shown in FIG. 1E, and by reference number 125, the contract platform may read, from the historical contract data, nonnumerical noncategorical data identifying implicit historical contract data. For example, after receiving the historical contract data from the external data structure, the contract platform may analyze the historical contract data to identify the nonnumerical noncategorical data in the historical contract data. The nonnumerical noncategorical data includes data that implicitly describes the historical contracts of the historical contract data. For example, the nonnumerical noncategorical data may include user comments regarding the historical contracts, profiling and/or explanatory information regarding the historical contracts, and/or the like. In some implementations, the nonnumerical noncategorical data may include image data. Accordingly, the contract platform may use one or more optical character recognition techniques to convert the image data in textual data prior to reading the nonnumerical noncategorical data from the historical contract data.

In some implementations, the contract platform may use one or more natural language processing techniques (e.g., for determining word embeddings in the historical contract data) to read the nonnumerical noncategorical data from the historical contract data. For example, the contract platform may use a bag of words technique, a term frequency and inverse document frequency (TF-IDF) technique, a Word2vec technique, a Doc2vec technique, and/or the like to read the nonnumerical noncategorical data.

The nonnumerical noncategorical data (read above) may identify the implicit historical contract data. The implicit historical contract data may include data that implicitly identifies or describes the historical contracts (e.g., implicit features of the historical contracts). In other words, the contract platform may use the one or more natural language processing techniques to read the implicit features of the historical contract data. The above natural language processing techniques are merely provided as examples. Other examples may differ from the techniques described herein.

The implicit historical contract data may include data that may be used to generate a knowledge graph for entities associated with the historical contracts, as will be described in more details below. The data (that may be used to generate the knowledge graph) may include information identifying the entities, organizational structures of the entities (e.g., departments, divisions, groups, and/or the like), personnel associated with the organization structures, technologies offered by the entities, goods and/or services offered by the entities, relationships between the entities, and/or the like. The data items listed above are intended as examples of implicit historical contract data. In practice, the implicit historical contract data may include one or more of the data items listed above and/or one or more other data items that are not listed above.

As shown in FIG. 1F, and by reference number 130, the contract platform may process the nonnumerical noncategorical data, with one or more artificial intelligence models, to convert the nonnumerical noncategorical data into vector format. For example, after reading the nonnumerical noncategorical data, the contract platform may generate vectors for the implicit historical contract data (e.g., the implicit features) of the nonnumerical noncategorical data. In some implementations, the contract platform may generate a vector of implicit features for each entity of the entities associated with the historical contracts and the vector may include data identifying each implicit feature of the entity. For example, the contract platform may process the nonnumerical noncategorical using one or more natural language processing techniques to generate the vectors. For instance, the contract platform may convert the implicit features (from the nonnumerical noncategorical data), for each historical contract, into vectors using a Word2vector technique, a Doc2vector technique, and/or the like.

Each implicit feature may be converted into one or more alphanumeric characters. For example, the contract platform may generate the one or more alphanumeric characters of an implicit feature based on information regarding the implicit feature (e.g., a name, an identifier, a description, and/or the like of the implicit feature). For instance, the vector of implicit features for an entity may be in a vector format: $b=(b_1, b_2, \ldots, b_n)$ where b represents the entity, $b_1$ represents a first implicit feature associated with the entity, $b_2$ represents a second implicit feature associated with the entity, and $b_n$ represents an nth implicit feature associated with the entity. In some implementations, the vector may include information identifying one or more historical contracts associated with the entity. The above techniques and vector format are merely provided as examples. Other examples may differ from the above techniques and vector format described herein.

In some implementations, the contract platform may train the one or more artificial intelligence models with historical data (e.g., historical data identifying historical nonnumerical noncategorical data that identifies the implicit features of historical contracts, historical converted data (e.g., data converted from the implicit features of the historical nonnumerical noncategorical data), historical vector formats of the historical converted data, and/or the like) to convert the nonnumerical noncategorical data into vector format.

The contract platform may train the one or more artificial intelligence models in a manner similar to the manner described below in connection with FIG. 2. Alternatively, rather than training the one or more artificial intelligence models, the contract platform may obtain the one or more artificial intelligence models from another system or device that trained the one or more artificial intelligence models. In this case, the other system or device may obtain the historical data (e.g., the historical data discussed above) for use in training the one or more artificial intelligence models, and may periodically receive additional data that the other system or device may use to retrain or update the one or more artificial intelligence models.

The contract platform may process the nonnumerical noncategorical data, with the one or more artificial intelligence models, to convert the nonnumerical noncategorical data into vector format. The contract platform may use the one or more artificial intelligence models to process the nonnumerical noncategorical data in a manner similar to the manner described below in connection with FIG. 3. The one or more artificial intelligence models may include a probabilistic model, a hidden Markov model, a maximum entropy model, and/or a conditional random fields model. The one or more artificial intelligence models discussed with respect to FIG. 1F may be the same as or different than the one or more artificial intelligence models discussed above with respect to FIG. 1C.

As shown in FIG. 1G, and by reference number 135, the contract platform may create a knowledge graph in vector format based on the nonnumerical noncategorical data in the vector format. For example, after converting the nonnumerical noncategorical data into vector format, the contract platform may generate a knowledge graph that includes the vectors generated for each contract of the historical contracts (included in the historical contract data). In some implementations, the contract platform may generate the knowledge graph using a generic knowledge graph (or base knowledge graph). The generic knowledge graph may include public information regarding the entities associated with the historical contracts. For example, the generic knowledge graph may include a network of nodes associated with the entities, with each node representing textual data or groups of textual data associated with a respective entity. For example, the textual data or groups of textual data may include data identifying the entity, one or more locations associated with the entity, one or more affiliates of the entity, technologies associated with the entity, goods and/or services offered by the entity, and/or other public information associated with the entity. In some implementations, the contract platform may obtain the generic knowledge graph from one or more third party sources. Alternatively, the contract platform may generate the generic knowledge graph based on public information and/or the historical contract data.

In some implementations, the contract platform may customize the generic knowledge graph based on the nonnumerical noncategorical data in vector format, to create the knowledge graph in vector format. In other words, the contract platform may modify (or supplement) the generic knowledge graph with the nonnumerical noncategorical data in vector format. For example, the contract platform may identify each of the entities (associated with the historical contracts) in the knowledge graph. For instance, the contract platform may use one or more algorithms to identify each node that includes data identifying an entity (of the entities associated with the historical contracts) and, thereby, identify the entity. The one or more algorithms may include a probabilistic model, a hidden Markov model, a maximum entropy model, and/or a conditional random fields model.

The contract platform may identify relationships between the entities identified in the generic knowledge graph. In some implementations, the contract platform may identify the relationships between the entities as part of identifying the entities in the generic knowledge graph. For example, the contract platform may use the one or more algorithms to identify the relationships between the entities (e.g., based on a length of a connection between nodes, a weight/thickness of the connection, and/or the like). After identifying the entities and the relationships between the entities, the contract platform may generate the knowledge graph in vector format based on the entities and the relationships between the entities. In some implementations, the nodes of the knowledge graph may represent the entities and the connections between the nodes may represent the relationships between the nodes. For example, a weight of a connection may represent a level of closeness of relationship between the nodes (e.g., entities). For instance, the greater the weight of the connection, the closer the relationship between the nodes (e.g., the entities), and vice versa. Additionally, one node (e.g., one entity) may be connected to one or more nodes (e.g., one or more entities). In some implementations, each node may include a vector (described above with respect to FIG. 1F) that includes data regarding an entity that the node represents. The vector may be supplemented with data included in the generic knowledge graph (which data was not previously included in the vector). In this regard, the contract platform may convert such data (in a manner similar to the manner described above with respect to FIG. 1F) and include such converted data in the vector.

In some implementations, the contract platform may store the knowledge graph in one or more data structures associated with the contract platform. The above knowledge graph is merely provided as an example. Other examples may differ from the knowledge graph described herein. For example, the nodes of the knowledge graph may represent one or more other pieces of information regarding the historical contracts. Alternatively, the contract platform may generate one or more knowledge graphs for one or more different pieces of information regarding the historical contracts.

Using the contract platform and the knowledge graph reduces the amount of time that would have taken a user to analyze an entirety of the historical contracts to identify one or more of the historical contracts with one or more entities that are similar to entities associated with a new contract to be generated, thereby preserving computing resources (e.g., processing resources, memory resources, communication resources, and/or the like), networking resources, and/or the like that would have otherwise been used to analyze the entirety of each of the historical contracts. Additionally, generating the knowledge graph reduces the amount of storage that is used, thereby preserving computing resources (e.g., processing resources, memory resources, communication resources, and/or the like), networking resources, and/or the like that would have otherwise been used to store the entirety of the historical contracts and/or the implicit features.

As shown in FIG. 1H, and by reference number 140, the contract platform may receive, from the client device, a request that includes data identifying a new contract to be created. For example, the contract platform may provide, to the client device, a user interface for submitting requests to identify contracts that are similar to new contracts to be generated. A user of the client device may submit, using the client device and via the user interface, the request. As an example, the data identifying the new contract may include information identifying one or more entities to be involved in the new contract, goods and/or services to be provided, one or more types of the services, an amount of personnel, a department, a division, and/or the like (of the one or more entities) that is to be involved in the contract, a period of performance, a cost associated with the period of performance, a location associated with the performance, one or more other explicit and/or implicit features, and/or the like. The data items listed above are intended as examples of data identifying the new contract. In practice, the data identifying the new contract may include one or more of the data items listed above and/or one or more other data items that are not listed above.

As shown in FIG. 1I, and by reference number 145, the contract platform may identify, in the taxonomy, a first set of similar contracts that include data similar to the data identifying the new contract. For example, after receiving the request from the client device, the contract platform may process the data identifying the new contract. For instance, the contract platform may read explicit features (of the new contract) from the data identifying the new contract, in a manner similar to the manner described above with respect to FIG. 1B. After reading the explicit features, the contract platform may convert the explicit features into a vector format and, thereby, generate a vector for the new contract, in a manner similar to the manner described above with respect to FIG. 1C.

The contract platform may search the taxonomy, using the vector generated for the new contract, to identify one or more historical contracts with vectors that include data similar to data included in the vector generated for the new contract. In other words, the contract platform may compare the data, included in the vector generated for the new contract, to the data included in the vectors generated for the historical contracts. In some implementations, the contract platform may identify the first set of similar contracts as contracts with vectors including a threshold amount of data similar to the data included in the vector generated for the new contract.

Using the contract platform and the taxonomy reduces the amount of time that would have taken to analyze an entirety of the historical contracts to identify one or more of the historical contracts similar to the new contract, thereby preserving computing resources (e.g., processing resources, memory resources, communication resources, and/or the like), networking resources, and/or the like that would have otherwise been used to analyze the entirety of each of the historical contracts.

As shown in FIG. 1J, and by reference number 150, the contract platform may identify, in the knowledge graph, a second set of similar contracts that include data similar to the data identifying the new contract. For example, after receiving the request from the client device, the contract platform may process the data identifying the new contract. For instance, the contract platform may read implicit features (of the new contract) from the data identifying the new contract, in a manner similar to the manner described above with respect to FIG. 1E. After reading the implicit features, the contract platform may convert the implicit features into a vector format and, thereby, generate a vector for the new contract, in a manner similar to the manner described above with respect to FIG. 1F. The contract platform may search the knowledge graph, using the vector generated for the new contract, to identify one or more entities with vectors that include data similar to data included in the vector generated for the new contract and, thereby, identify one or more historical contracts associated with the one or more entities. In other words, the contract platform may compare the data, included in the vector generated for the new contract, to the data included in the vectors generated for the entities (as described above in FIG. 1F). In some implementations, the contract platform may identify the second set of similar contracts as contracts with vectors including a threshold amount of data similar to the data included in the vector generated for the new contract.

Using the contract platform and the knowledge graph reduces the amount of time that would have taken to analyze an entirety of the historical contracts to identify one or more of the historical contracts similar to the new contract, thereby preserving computing resources (e.g., processing resources, memory resources, communication resources, and/or the like), networking resources, and/or the like that would have otherwise been used to analyze the entirety of each of the historical contracts.

As shown in FIG. 1K, and by reference number 155, the contract platform may process data identifying the first set of similar contracts and the second set of similar contracts and the new contract, with one or more mathematical models, to determine similarity scores between the first set of similar contracts and the second set of similar contracts and the new contract. The one or more mathematical models may include a Euclidian distance model, a min-max based normalization model, and/or a cosine similarity model. For example, the contract platform may compare the vector generated based on the explicit features of the new contract and the vectors generated for each contract of the first set of similar contracts, using the one or more mathematical models, to determine a measure of similarity (e.g., a similarity score) between the new contract and the contract (of the first set of similar contracts).

Additionally, the contract platform may compare the vector generated based on the implicit features of the new contract and the vectors generated for each contract of the second set of similar contracts, using the one or more mathematical models, to determine a measure of similarity (e.g., a similarity score) between the new contract and the contract (of the second set of similar contracts). In some implementations, the contract platform may use a particular one of the one or more mathematical models based on a type of feature identified by the vectors generated for the new contract.

Determining the similarity scores ensures that the most relevant similar contracts are identified for the new contract and reduces a likelihood of the user requesting one or more additional searches of the historical contract data, thereby preserving computing resources (e.g., processing resources, memory resources, communication resources, and/or the like), networking resources, and/or the like that would have otherwise been used to perform one or more additional searches of the historical contract data.

The similarity scores are merely provided as examples. Other examples may differ from the similarity scores described herein. For example, the contract platform may determine a measure of similarity that is different than a score.

As shown in FIG. 1L, and by reference number 160, the contract platform may provide, to the client device, data identifying the first set of similar contracts and the second set of similar contracts and the similarity scores associated with the first set of similar contracts and the second set of similar contracts. In some implementations, the contract platform may rank the first set of similar contracts and the second set of similar contracts, based on the similarity scores, and thereby generate a ranked list of similar contracts. The contract platform may provide the ranked list of similar contracts to the client device via the user interface.

Alternatively, after generating the ranked list of similar contracts, the contract platform may remove a portion of the similar contracts from the ranked list of similar contracts, based on the ranking, to generate a modified ranked list of similar contracts and may provide the modified ranked list of similar contracts to the client device. In some implementations, such portion of the similar contracts may be removed based on the similar contracts not meeting one or more criteria. The one or more criteria may include a threshold similarity score, a quantity of similar contracts to be provided to the user via the user interface, and/or the like. In some implementations, the one or more criteria may be provided by the user (e.g., as part of the request).

In some implementations, the contract platform may rank the first set of similar contracts based on the similarity scores of the first set of similar contracts and provide a ranked list of the first set of similar contracts to the client device via the user interface, in a manner similar to the manner described above. The contract platform may rank the second set of similar contracts based on the similarity scores of the second set of similar contracts and provide a ranked list of the second set of similar contracts to the client device via the user interface, in a manner similar to the manner described above.

In some implementations, the contract platform may provide information regarding the similarity scores such as, for example, a basis for determining the similarity scores, information identifying the explicit features and implicit features of the new contract, information identifying the explicit features and implicit features of the similar contracts, and/or the like. Providing the data identifying the first set of similar contracts and the second set of similar contracts and the similarity scores along with the information regarding the similarity scores reduces an amount of time the user would have spent analyzing the similar contracts (e.g., to ensure a match with the new contract), thereby preserving computing resources (e.g., processing resources, memory resources, communication resources, and/or the like), networking resources, and/or the like that would have otherwise been used by the user to analyze the similar contracts.

As shown in FIG. 1L, and by reference number 165, the contract platform may receive, from the client device, feedback data associated with the similarity scores and/or the first set of similar contracts and the second set of similar contracts. For example, after providing the data identifying the first set of similar contracts and the second set of similar contracts and the similarity scores associated with the first set of similar contracts and the second set of similar contracts, the contract platform may prompt the user, via the user interface, for feedback regarding the similarity scores and/or the first set of similar contracts and the second set of similar contracts.

The user may provide, using the client device and via the user interface, the feedback data and the contract platform may receive the feedback data from the client device. In some implementations, the feedback data may indicate that the user is satisfied with all or a portion of the first set of similar contracts and the second set of similar contracts, indicate that one or more features of the new contract are more valued by the user, and/or the like.

As shown in FIG. 1M, and by reference number 170, the contract platform may determine weights for the similarity scores based on the feedback data. For example, the contract platform may determine a weight for a similarity score based on the feedback data indicating whether a level of preference (or satisfaction) with respect to the user for the corresponding contract, one or more features of the corresponding contract, a type of feature (e.g., explicit feature or implicit feature), and/or the like. In this regard, the contract platform may increase or decrease the weight of the similarity score in accordance with the feedback data indicating an increase or a decrease of the level of preference.

As shown in FIG. 1N, and by reference number 175, the contract platform may calculate final similarity scores between the first and second sets of similar contracts and the new contract based on the weights and the similarity scores. For example, the contract platform may determine a final similarity score for a similar contract (of the first set of similar contracts or the second set of similar contracts) by adjusting the similarity score of the similar contract based on the weight determined for the similarity score. For instance, the contract platform may increase or decrease the similarity score based on the weight determined for the similarity score.

Calculating the final similarity scores reduces a likelihood of the user requesting one or more additional searches of the historical contract data to identify additional similar contracts, thereby preserving computing resources (e.g., processing resources, memory resources, communication resources, and/or the like), networking resources, and/or the like that would have otherwise been used to perform one or more additional searches of the historical contract data to identify additional similar contracts.

As shown in FIG. 1O, and by reference number 180, the contract platform may perform one or more actions based on the final similarity scores. The one or more actions may include providing, for display, the final similarity scores. For example, the contract platform may provide, to the client device, the final similarity scores and data identifying the first set of similar contracts and/or the second set of similar contracts, associated with those final similarity scores, for display via the user interface. In some implementations, the first set of similar contracts and the second set of similar contracts may be ranked in a manner similar to the manner described above, prior to being provided to the client device. Additionally, or alternatively, the contract platform may provide information regarding the final similarity scores in a manner similar to the manner described above with respect to the information regarding the similarity scores.

Providing the final similarity scores and the information identifying the first set of similar contracts and/or the second set of similar contracts, associated with those final similarity scores, indicates that the feedback has been considered and, accordingly, reduces a likelihood of the user requesting one or more additional searches of the historical contract data to identify additional similar contracts, thereby preserving computing resources (e.g., processing resources, memory resources, communication resources, and/or the like), networking resources, and/or the like that would have otherwise been used to perform one or more additional searches of the historical contract data to identify additional similar contracts.

The one or more actions may include enabling a selection of one of the similar contracts based on the final similarity scores. For example, the contract platform may enable the user to select, using the client device and via the user interface, a similar contract, from the first set of similar contracts or the second set of similar contracts, based on the final similarity scores. In some implementations, the selected similar contract may correspond to a contract with a highest final similarity score out of the final similarity scores. The contract platform may enable the user to select, using the client device and via the user interface, all or a portion of the selected similar contract to generate the new contract. For example, the contract platform may permit the user, via the user interface, to select, using the client device, all or a portion of the similar contract. In some implementations, the contract platform may enable the user to select a plurality of similar contracts (rather than just one similar contract). In this case, the contract platform may use all or a portion of the plurality of similar contracts to generate the new contract.

Enabling the selection of one or more of the similar contracts to generate the new contract reduces the amount of time it would have taken to generate the new contract, thereby preserving computing resources (e.g., processing resources, memory resources, communication resources, and/or the like), networking resources, and/or the like that would have otherwise been used to generate the new contract.

The one or more actions may include automatically generating terms for the new contract based on the final similarity scores. For example, the contract platform may generate the terms for the new contract by identifying and selecting terms, from one or more of the similar contracts, corresponding to features associated with a weight that meets a threshold weight. The contract platform may modify the selected terms based on the data identifying the new contract (e.g., to bring the selected terms in conformity with the data). In some implementations, the contract platform may automatically include the terms in the new contract. In other words, the contract platform may generate a draft of the new contract.

Generating terms for the new contract (and including the terms in the new contract) reduces the amount of time it would have taken to generate terms for the new contract, thereby preserving computing resources (e.g., processing resources, memory resources, communication resources, and/or the like), networking resources, and/or the like that would have otherwise been used to generate the terms and the new contract.

The one or more actions may include automatically proposing terms and clauses for the new contract based on the final similarity scores. For example, the contract platform may identify one or more similar contracts, from the first set of similar contracts and/or the second set of similar contracts, that have one or more criteria similar to the one or more criteria discussed above with respect to FIG. 1K. The contract platform may compare features, of the data identifying the new contract, and features of the one or more similar contracts and may identify terms and clauses (from the one or more similar contracts) associated with features that match the features of the data identifying the new contracts. For example, the features of the one or more similar contracts may meet a threshold level of match with respect to the features of the data identifying the new contract.

Automatically proposing terms and clauses reduces the amount of time it would have taken to search for and identify terms and clauses for the new contract, thereby preserving computing resources (e.g., processing resources, memory resources, communication resources, and/or the like), networking resources, and/or the like that would have otherwise been used to search for and identify terms and clauses for the new contract.

The one or more actions may include providing a recommendation for one of the similar contracts based on the final similarity scores. In some implementations, the contract platform may identify a similar contract, from the first set of similar contracts and/or the second set of similar contracts, with a final similarity score that is highest out of the final similarity scores. Additionally, or alternatively, the contract platform may identify the similar contract as a contract that meets one or more criteria similar to the one or more criteria discussed above with respect to FIG. 1K. The contract platform may provide, to the client device and via the user interface, data identifying the similar contract and the final similarity score of the similar contract as a recommendation for generating the new contract.

Providing the recommendation reduces the amount of time it would have taken to search for and identify a contract that is similar (or is most similar) to for the new contract, thereby preserving computing resources (e.g., processing resources, memory resources, communication resources, and/or the like), networking resources, and/or the like that would have otherwise been used to search for and identify contracts similar to the new contract.

The one or more actions may include retraining the one or more artificial intelligence models and/or the one or more mathematical models based on the final similarity scores. For example, the contract platform may retrain the one or more artificial intelligence models and/or the one or more mathematical models based on the feedback data and the weights discussed above with respect to FIGS. 1L to 1N. In this regard, the retrained one or more artificial intelligence models and/or one or more mathematical models may take into account the feedback data, thereby identifying features (of contracts) that may be relevant to a user and improving the process of identifying similar contracts.

Accordingly, retraining the one or more artificial intelligence models and/or the one or more mathematical models based on the final similarity scores ensures that the most relevant similar contracts are identified for the new contract and reduces a likelihood of the user requesting one or more additional searches of the historical contract data, thereby preserving computing resources (e.g., processing resources, memory resources, communication resources, and/or the like), networking resources, and/or the like that would have otherwise been used to perform one or more additional searches of the historical contract data.

FIGS. 1P and 1Q illustrate an overview of FIGS. 1A-1O. As shown in FIG. 1P, and by operation 1, the contract platform may identify historical contract data from data sources. As shown in FIG. 1P, and by operation 2, the contract platform may use a feature engineering technique to process the historical contract data and identify explicit features and implicit features of historical contracts identified in the historical contract data. The contract platform may generate a vector of explicit features for each historical contract and a vector of implicit features for each of the entities identified in the historical contract data. As shown in FIG. 1P, and by operation 3, the contract platform may obtain a base knowledge graph from a third-party source. As shown in FIG. 1P, and by operation 4, the contract platform may use the base knowledge graph to generate a knowledge graph that identifies the entities and represents relationships between the entities. In some implementations, the contract platform may generate the vectors of implicit features based on the knowledge graph. The contract platform may generate a vector for a historical contract by combining a corresponding vector of explicit features and a corresponding vector of implicit features.

As shown in FIG. 1Q, and by operation 5, the contract platform may use a similarity engine to determine a measure of similarity (e.g., a score) between a new contract (to be generated) and the historical contracts and identify similar historical contracts. As shown in FIG. 1Q, and by operation 6, the contract platform may rank the similar historical contracts and provided the ranked similar historical contracts as a recommendation for the new contract. As shown in FIG. 1Q, and by operations 7 and 8, a user may review the similar historical contracts and provide feedback regarding the similar historical contracts. As shown in FIG. 1Q, and by operation 8, the contract platform may determine weights for the similar historical contracts based on the feedback and may adjust the measure of similarity for the similar historical contracts based on the weights.

As indicated above, FIGS. 1A-1Q are provided as an example. Other examples may differ from what is described with respect to FIGS. 1A-1Q. The number and arrangement of devices shown in FIGS. 1A-1Q are provided as an example. In practice, there may be additional devices, fewer devices, different devices, or differently arranged than those shown in FIGS. 1A-1Q. Furthermore, two or more devices shown in FIGS. 1A-1Q may be implemented within a single device, or a single device shown in FIGS. 1A-1Q may be implemented as multiple, distributed devices. Additionally, or alternatively, a set of devices (e.g., one or more devices) shown in FIGS. 1A-1Q may perform one or more functions described as being performed by another set of devices shown in FIGS. 1A-1Q.

Figure 2:
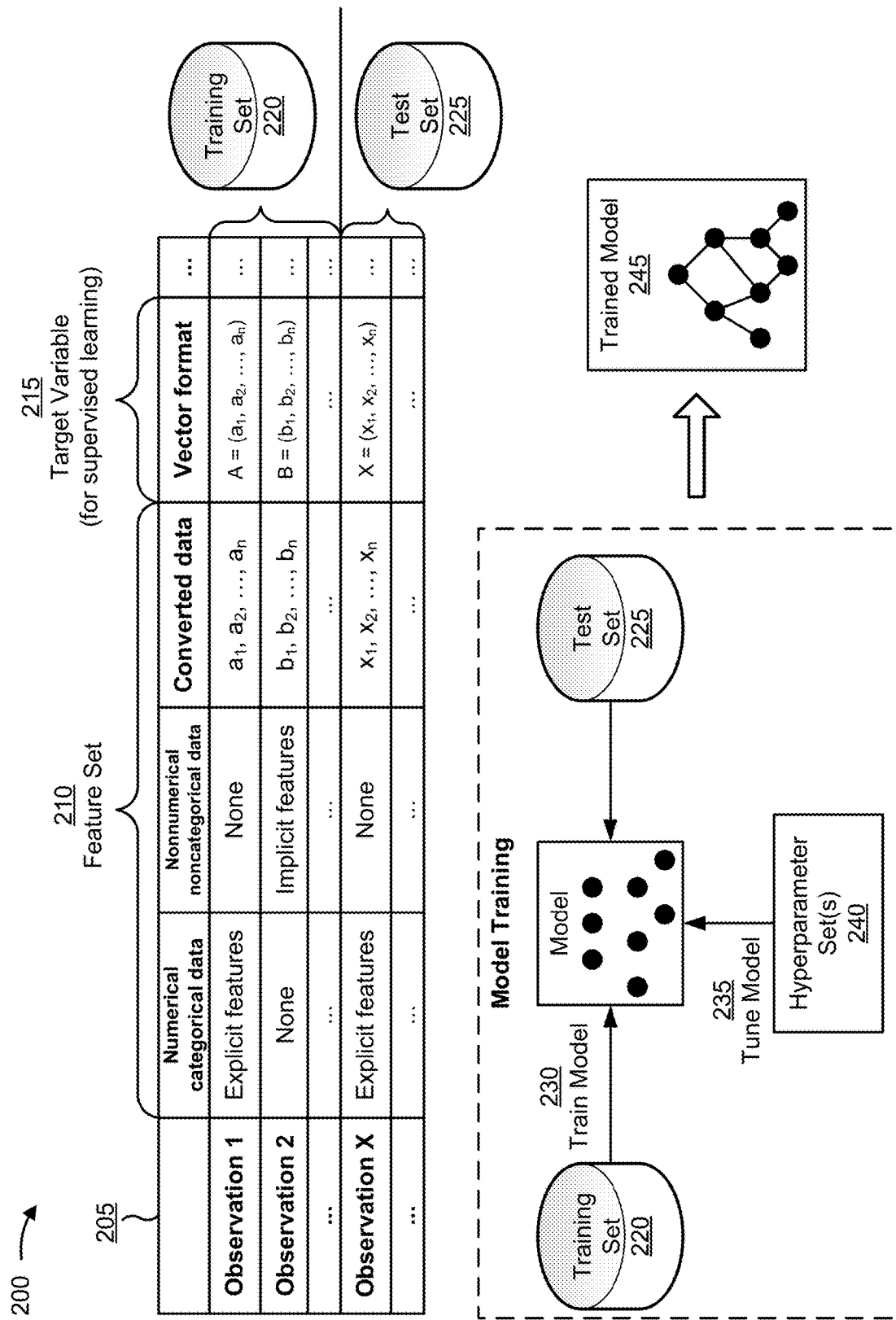
FIG. 2 is a diagram illustrating an example of training a machine learning model.

FIG. 2 is a diagram illustrating an example 200 of training a machine learning model in connection with identifying historical contracts that are similar to a new contract to be generated. The machine learning model training described herein may be performed using a machine learning system. The machine learning system may include or may be included in a computing device, a server, a cloud computing environment, and/or the like, such as contract platform 401 described in more detail below.

As shown by reference number 205, a machine learning model may be trained using a set of observations. The set of observations may be obtained and/or input from historical data, such as data gathered during one or more processes described herein. For example, the set of observations may include data gathered from user interaction with and/or user input to contract platform 401, as described elsewhere herein. In some implementations, the machine learning system may receive the set of observations (e.g., as input) from contract platform 401.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from contract platform 401. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from contract platform 401, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of numerical categorical data, a second feature of nonnumerical noncategorical data, a third feature of converted data, and so on. As shown, for a first observation, the first feature may have a value of Explicit features, the second feature may have a value of None, the third feature may have a value of $a_1, a_2, \ldots, a_n$, and so on. These features and feature values are provided as examples, and may differ in other examples. For example, the feature set may include one or more of the following features: Implicit features, weight=1, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is Vector format, which has a value of $A=(a_1, a_2, \ldots, a_n)$ for the first observation.

The feature set and target variable described above are provided as examples, and other examples may differ from what is described above. For example, for a target variable of Weight, the feature set may include Explicit Features, None, $z_1, z_2, \ldots, z_n$.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
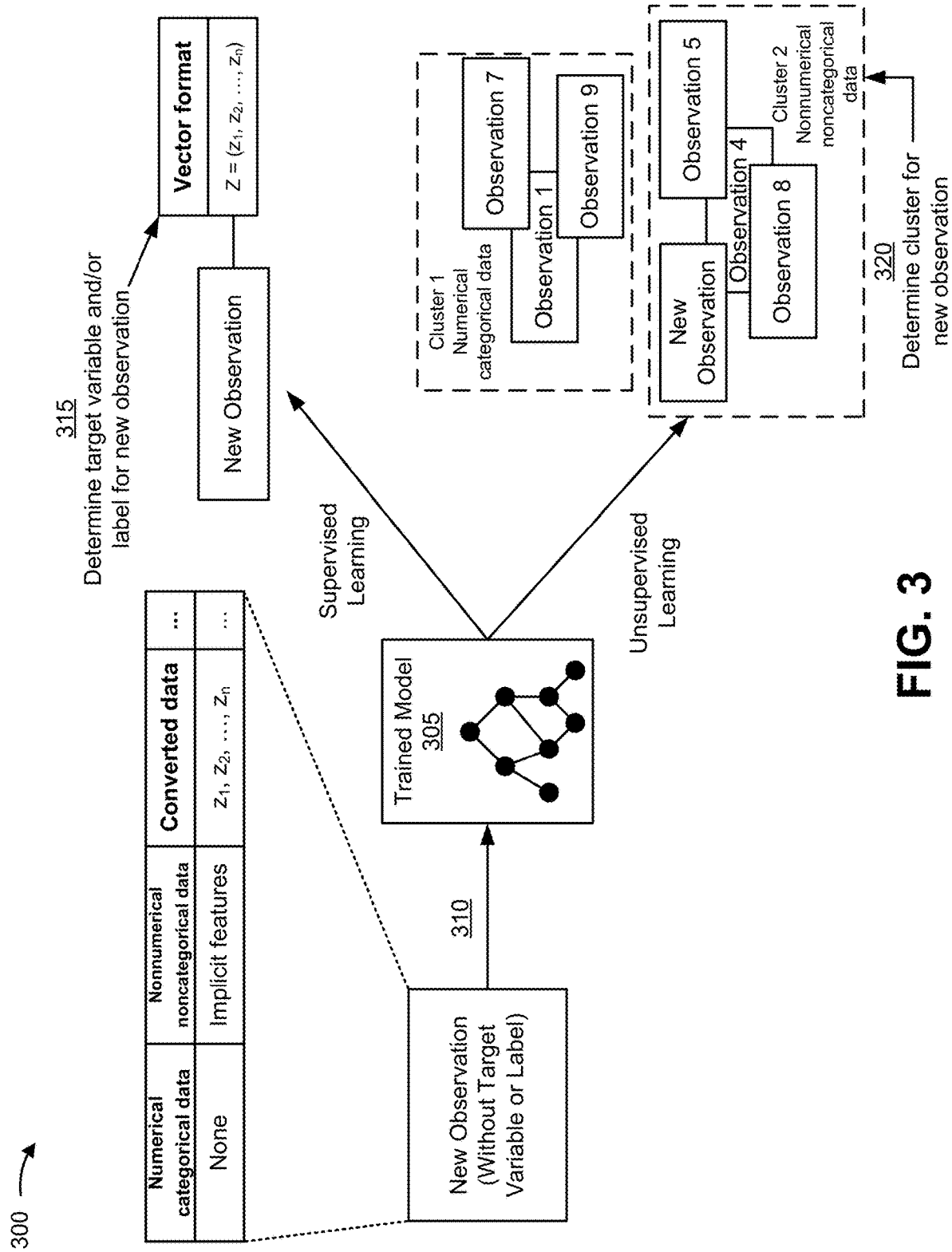
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as contract platform 401.

As shown by reference number 310, the machine learning system may receive a new observation (or a set of new observations), and may input the new observation to the machine learning model 305. As shown, the new observation may include a first feature of numerical categorical data, a second feature of nonnumerical noncategorical data, a third feature of converted data, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of Vector format for the target variable of $Z=(z_1, z_2, \ldots, z_n)$ for the new observation, as shown by reference number 315. Based on this prediction (e.g., based on the value having a particular label or classification, based on the value satisfying or failing to satisfy a threshold, and/or the like), the machine learning system may provide a recommendation and/or output for determination of a recommendation, such as different vectors and vector formats based on the type of features (e.g., explicit feature or implicit feature). Additionally, or alternatively, the machine learning system may perform an automated action and/or may cause an automated action to be performed (e.g., by instructing another device to perform the automated action), such as generating a vector of explicit features, a vector of implicit features, and/or the like. In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In this way, the machine learning system may apply a rigorous and automated process to identify historical contracts similar to a contract to be generated. The machine learning system enables recognition and/or identification of tens, hundreds, thousands, or millions of features and/or feature values for tens, hundreds, thousands, or millions of observations, thereby increasing accuracy and consistency and reducing delay associated with identifying historical contracts similar to a contract to be generated relative to requiring computing resources to be allocated for tens, hundreds, or thousands of operators to manually identify historical contracts similar to a contract to be generated using the features or feature values.

As indicated above, FIG. 3 is provided as an example. Other examples may differ from what is described in connection with FIG. 3.

Figure 4:
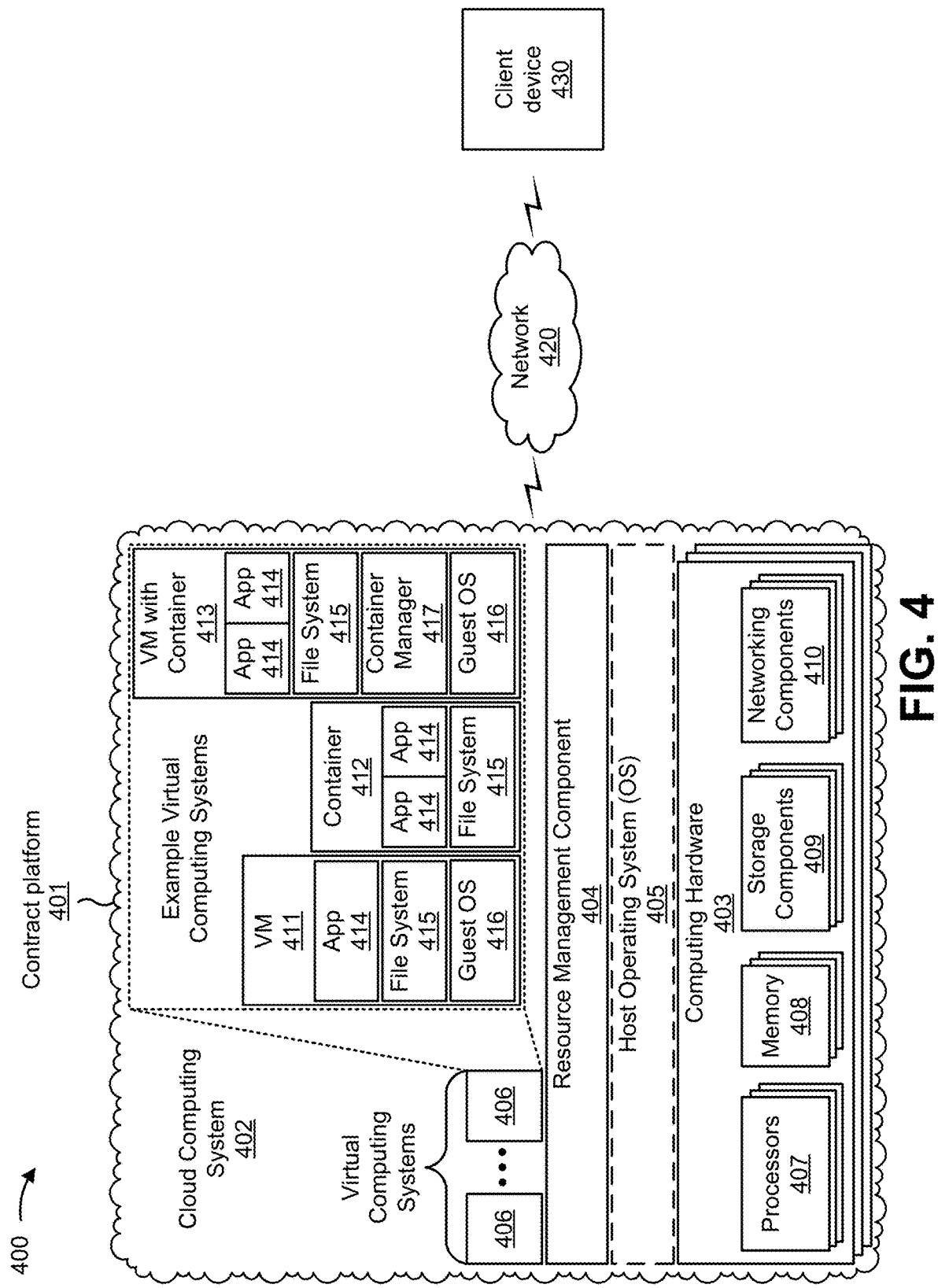
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a contract platform 401. The contract platform 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420 and/or a client device 430. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the contract platform 401 to perform one or more operations or processes described herein. A storage component 409 includes a hard disk or another type of storage device that stores information, data, and/or software (e.g., code, instructions, and/or the like) related to the operation and use of the contract platform 401. In some implementations, memory 408 and/or storage component 409 is/are implemented as a non-transitory computer readable medium. A networking component 410 includes a network interface and corresponding hardware that enables the contract platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application (s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the contract platform 401 may include one or more elements 403-417 of the cloud computing system 402, may execute within the cloud computing system 402, and/or may be hosted within the cloud computing system 402, in some implementations, the contract platform 401 may not be cloud-based (e.g., may be implemented outside of a cloud computing system) or may be partially cloud-based. For example, the contract platform 401 may include one or more devices that are not part of the cloud computing system 402, such as device 500 of FIG. 5, which may include a standalone server or another type of computing device. The contract platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

The client device 430 includes one or more devices capable of receiving, generating, storing, processing, and/or providing information, such as information described herein. For example, client device 430 may include a mobile phone (e.g., a smart phone, a radiotelephone, and/or the like), a laptop computer, a tablet computer, a desktop computer, a handheld computer, and/or the like. In some implementations, client device 430 may receive information from and/or transmit information to contract platform 401.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
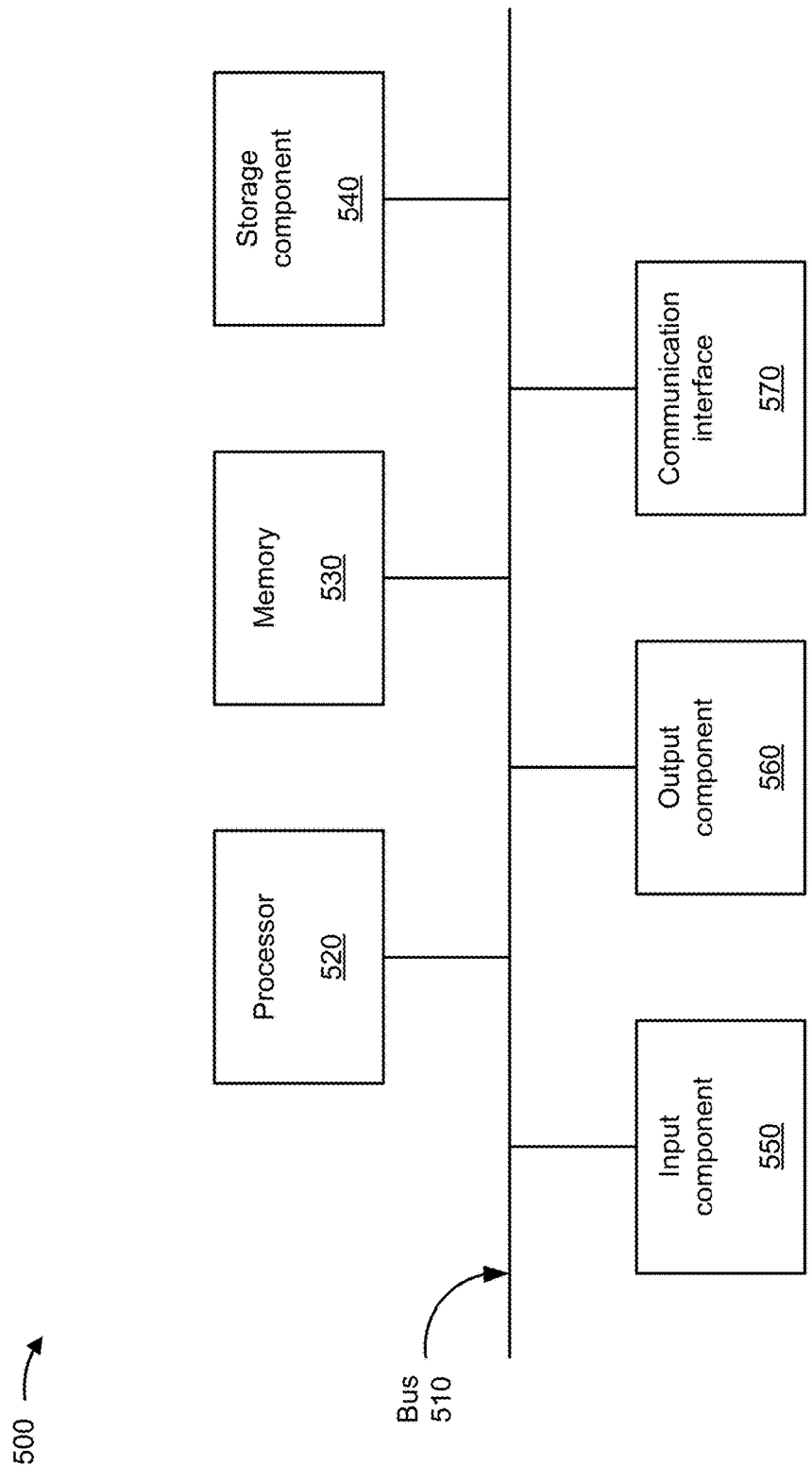
FIG. 5 is a diagram of example components of one or more devices of FIG. 4.

FIG. 5 is a diagram of example components of a device 500. Device 500 may correspond to contract platform 401 and/or client device 430. In some implementations, contract platform 401 and/or client device 430 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
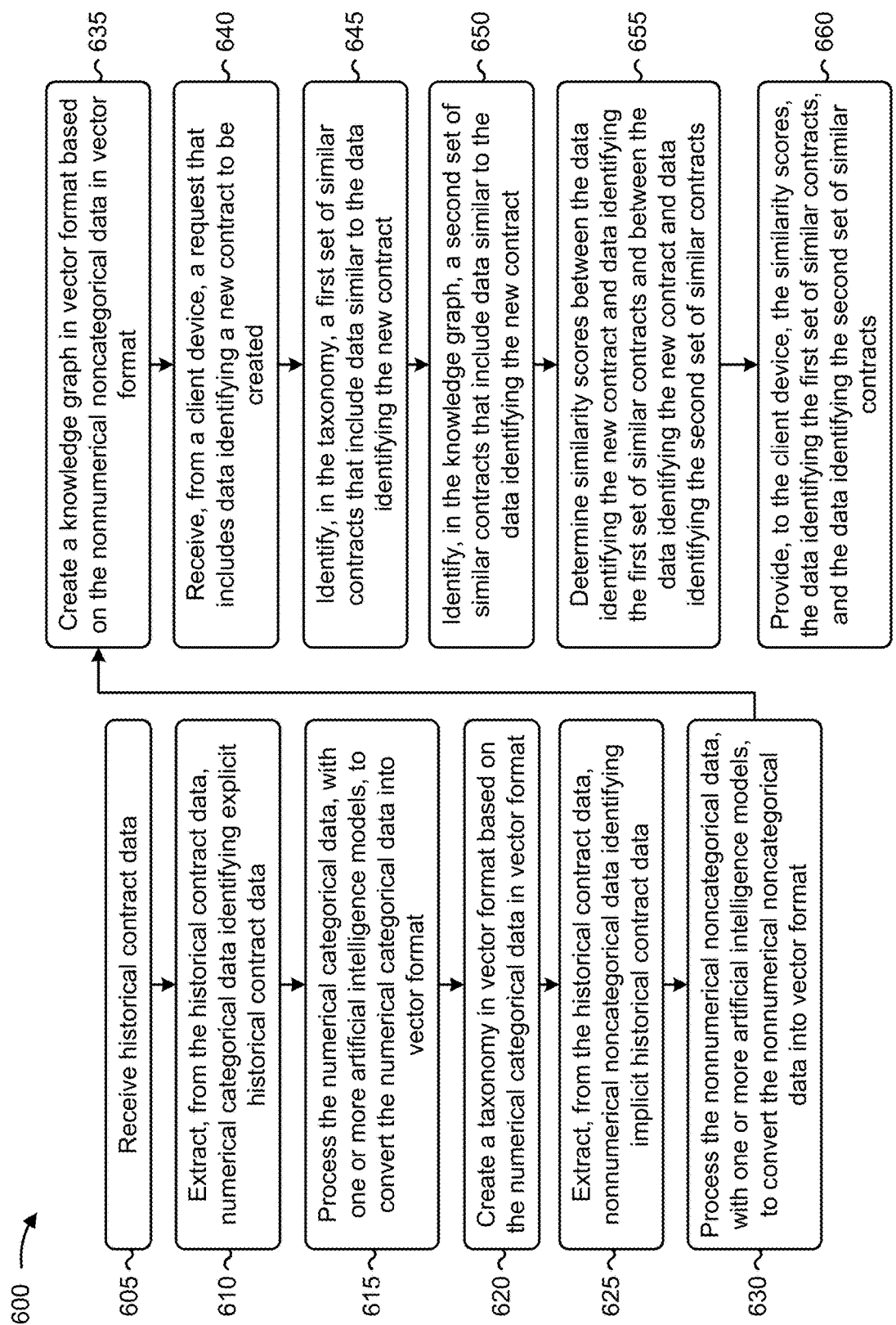
FIGS. 6-8 are flow charts of example processes relating to identifying and providing recommendations for data (e.g., from prior contract(s)) to be included in a contract.

FIG. 6 is a flow chart of an example process 600 associated with a contract platform. In some implementations, one or more process blocks of FIG. 6 may be performed by a device (e.g., contract platform 401). In some implementations, one or more process blocks of FIG. 6 may be performed by another device or a group of devices separate from or including the device, such as a client device (e.g., client device 430), and/or the like.

As shown in FIG. 6, process 600 may include receiving historical contract data (block 605). For example, the device (e.g., using processor 520, memory 530, storage component 540, input component 550, output component 560, communication interface 570, and/or the like) may receive, from an internal data structure and an external data structure, historical contract data identifying one or more of historical contracts, historical contract terms, or personnel involved in the historical contracts, as described above.

As further shown in FIG. 6, process 600 may include reading, from the historical contract data, numerical categorical data identifying explicit historical contract data (block 610). For example, the device (e.g., using processor 520, memory 530, storage component 540, input component 550, output component 560, communication interface 570, and/or the like) may read, from the historical contract data, numerical categorical data identifying explicit historical contract data, as described above.

As further shown in FIG. 6, process 600 may include processing the numerical categorical data, with one or more artificial intelligence models, to convert the numerical categorical data into vector format (block 615). For example, the device (e.g., using processor 520, memory 530, storage component 540, input component 550, output component 560, communication interface 570, and/or the like) may process the numerical categorical data, with one or more artificial intelligence models, to convert the numerical categorical data into vector format, as described above.

As further shown in FIG. 6, process 600 may include creating a taxonomy in vector format based on the numerical categorical data in vector format (block 620). For example, the device (e.g., using processor 520, memory 530, storage component 540, input component 550, output component 560, communication interface 570, and/or the like) may create a taxonomy in vector format based on the numerical categorical data in vector format, as described above.

As further shown in FIG. 6, process 600 may include reading, from the historical contract data, nonnumerical noncategorical data identifying implicit historical contract data (block 625). For example, the device (e.g., using processor 520, memory 530, storage component 540, input component 550, output component 560, communication interface 570, and/or the like) may read, from the historical contract data, nonnumerical noncategorical data identifying implicit historical contract data, as described above.

As further shown in FIG. 6, process 600 may include processing the nonnumerical noncategorical data, with one or more artificial intelligence models, to convert the nonnumerical noncategorical data into vector format (block 630). For example, the device (e.g., using processor 520, memory 530, storage component 540, input component 550, output component 560, communication interface 570, and/or the like) may process the nonnumerical noncategorical data, with the one or more artificial intelligence models, to convert the nonnumerical noncategorical data into vector format, as described above.

As further shown in FIG. 6, process 600 may include creating a knowledge graph in vector format based on the nonnumerical noncategorical data in vector format (block 635). For example, the device (e.g., using processor 520, memory 530, storage component 540, input component 550, output component 560, communication interface 570, and/or the like) may creat a knowledge graph in vector format based on the nonnumerical noncategorical data in vector format, as described above.

As further shown in FIG. 6, process 600 may include receiving, from a client device, a request that includes data identifying a new contract to be created (block 640). For example, the device (e.g., using processor 520, memory 530, storage component 540, input component 550, output component 560, communication interface 570, and/or the like) may receive, from a client device, a request that includes data identifying a new contract to be created, as described above.

As further shown in FIG. 6, process 600 may include identifying, in the taxonomy, a first set of similar contracts that include data similar to the data identifying the new contract (block 645). For example, the device (e.g., using processor 520, memory 530, storage component 540, input component 550, output component 560, communication interface 570, and/or the like) may identify, in the taxonomy, a first set of similar contracts that include data similar to the data identifying the new contract, as described above.

As further shown in FIG. 6, process 600 may include identifying, in the knowledge graph, a second set of similar contracts that include data similar to the data identifying the new contract (block 650). For example, the device (e.g., using processor 520, memory 530, storage component 540, input component 550, output component 560, communication interface 570, and/or the like) may identify, in the knowledge graph, a second set of similar contracts that include data similar to the data identifying the new contract, as described above.

As further shown in FIG. 6, process 600 may include determining similarity scores between the data identifying the new contract and data identifying the first set of similar contracts and between the data identifying the new contract and data identifying the second set of similar contracts (block 655). For example, the device (e.g., using processor 520, memory 530, storage component 540, input component 550, output component 560, communication interface 570, and/or the like) may determine similarity scores between the data identifying the new contract and data identifying the first set of similar contracts and between the data identifying the new contract and data identifying the second set of similar contracts, as described above.

As further shown in FIG. 6, process 600 may include providing, to the client device, the similarity scores, the data identifying the first set of similar contracts, and the data identifying the second set of similar contracts (block 660). For example, the device (e.g., using processor 520, memory 530, storage component 540, input component 550, output component 560, communication interface 570, and/or the like) may provide, to the client device, the similarity scores, the data identifying the first set of similar contracts, and the data identifying the second set of similar contracts, as described above.

Process 600 may include additional implementations, such as any single implementation or any combination of implementations described below and/or in connection with one or more other processes described elsewhere herein.

In a first implementation, determining the similarity scores comprises: processing the data identifying the first set of similar contracts, the data identifying the second set of similar contracts, and the data identifying new contract, with one or more mathematical models, to determine the similarity scores between the data identifying the new contract and the data identifying the first set of similar contracts and between the data identifying the new contract and the data identifying the second set of similar contracts.

In a second implementation, alone or in combination with the first implementation, the one or more mathematical models include one or more of: a Euclidian distance model, a min-max based normalization model, or a cosine similarity model.

In a third implementation, alone or in combination with one or more of the first and second implementations, process 600 includes receiving, from the client device, feedback data associated with the similarity scores or with the data identifying the first set of similar contracts and the data identifying the second set of similar contracts; determining weights for the similarity scores based on the feedback data; calculating final similarity scores between the new contract and the first set of similar contracts and between the new contract and the second set of similar contracts, based on the weights and the similarity scores; and performing one or more actions based on the final similarity scores.

In a fourth implementation, alone or in combination with one or more of the first through third implementations, performing the one or more actions comprises one or more of: providing, to the client device, the final similarity scores and data identifying the first set of similar contracts and the second set of similar contracts; enabling selection of a similar contract, from the first set of similar contracts or the second set of similar contracts, based on the final similarity scores; or automatically generating terms for the new contract based on the final similarity scores.

In a fifth implementation, alone or in combination with one or more of the first through fourth implementations, performing the one or more actions comprises one or more of: automatically proposing terms and clauses for the new contract based on the final similarity scores; providing, to the client device, a recommendation for a similar contract, from the first set of similar contracts or the second set of similar contracts, based on the final similarity scores; or retraining the one or more artificial intelligence models based on the final similarity scores.

In a sixth implementation, alone or in combination with one or more of the first through fifth implementations, reading, from the historical contract data, nonnumerical noncategorical data identifying implicit historical contract data comprises: processing the historical contract data, with a feature engineering technique, to read the nonnumerical noncategorical data from the historical contract data. In a seventh implementation, alone or in combination with one or more of the first through sixth implementations, the historical contract data is received from an internal data structure and an external data structure, and the historical contract data identifies one or more of historical contracts, historical contract terms, or personnel involved in the historical contracts.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
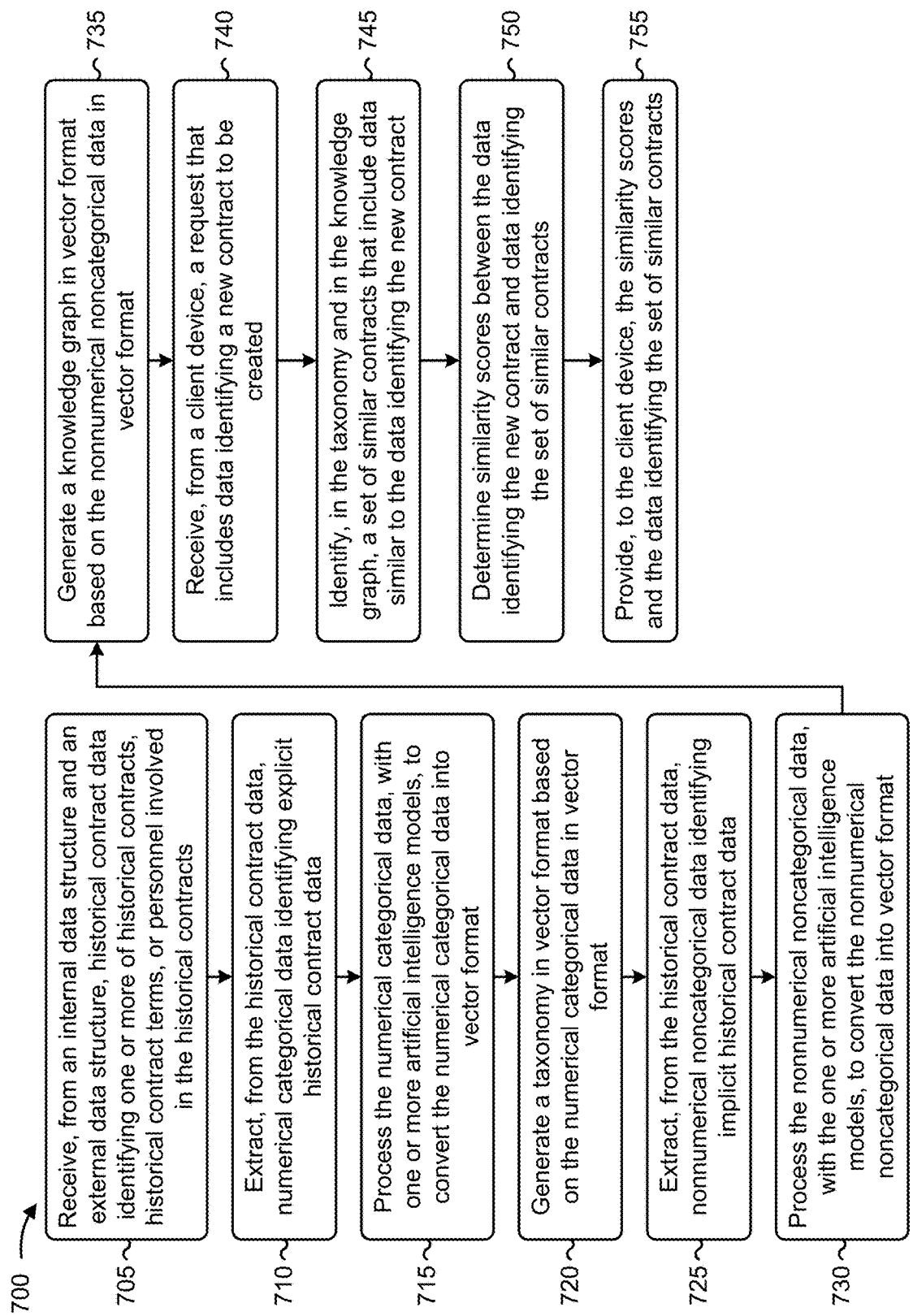

FIG. 7 is a flow chart of an example process 700 associated with a contract platform. In some implementations, one or more process blocks of FIG. 7 may be performed by a device (e.g., contract platform 401). In some implementations, one or more process blocks of FIG. 7 may be performed by another device or a group of devices separate from or including the device, such as a client device (e.g., client device 430), and/or the like.

As shown in FIG. 7, process 700 may include receiving, from an internal data structure and an external data structure, historical contract data identifying one or more of historical contracts, historical contract terms, or personnel involved in the historical contracts (block 705). For example, the device (e.g., using processor 520, memory 530, storage component 540, input component 550, output component 560, communication interface 570, and/or the like) may receive, from an internal data structure and an external data structure, historical contract data identifying one or more of historical contracts, historical contract terms, or personnel involved in the historical contracts, as described above.

As further shown in FIG. 7, process 700 may include read, from the historical contract data, numerical categorical data identifying explicit historical contract data (block 710). For example, the device (e.g., using processor 520, memory 530, storage component 540, input component 550, output component 560, communication interface 570, and/or the like) may read, from the historical contract data, numerical categorical data identifying explicit historical contract data, as described above.

As further shown in FIG. 7, process 700 may include processing the numerical categorical data, with one or more artificial intelligence models, to convert the numerical categorical data into vector format (block 715). For example, the device (e.g., using processor 520, memory 530, storage component 540, input component 550, output component 560, communication interface 570, and/or the like) may process the numerical categorical data, with one or more artificial intelligence models, to convert the numerical categorical data into vector format, as described above.

As further shown in FIG. 7, process 700 may include generating a taxonomy in vector format based on the numerical categorical data in vector format (block 720). For example, the device (e.g., using processor 520, memory 530, storage component 540, input component 550, output component 560, communication interface 570, and/or the like) may generate a taxonomy in vector format based on the numerical categorical data in vector format, as described above.

As further shown in FIG. 7, process 700 may include read, from the historical contract data, nonnumerical noncategorical data identifying implicit historical contract data (block 725). For example, the device (e.g., using processor 520, memory 530, storage component 540, input component 550, output component 560, communication interface 570, and/or the like) may read, from the historical contract data, nonnumerical noncategorical data identifying implicit historical contract data, as described above.

As further shown in FIG. 7, process 700 may include processing the nonnumerical noncategorical data, with the one or more artificial intelligence models, to convert the nonnumerical noncategorical data into vector format (block 730). For example, the device (e.g., using processor 520, memory 530, storage component 540, input component 550, output component 560, communication interface 570, and/or the like) may process the nonnumerical noncategorical data, with the one or more artificial intelligence models, to convert the nonnumerical noncategorical data into vector format, as described above.

As further shown in FIG. 7, process 700 may include generating a knowledge graph in vector format based on the nonnumerical noncategorical data in vector format (block 735). For example, the device (e.g., using processor 520, memory 530, storage component 540, input component 550, output component 560, communication interface 570, and/or the like) may generate a knowledge graph in vector format based on the nonnumerical noncategorical data in vector format, as described above.

As further shown in FIG. 7, process 700 may include receiving, from a client device, a request that includes data identifying a new contract to be created (block 740). For example, the device (e.g., using processor 520, memory 530, storage component 540, input component 550, output component 560, communication interface 570, and/or the like) may receive, from a client device, a request that includes data identifying a new contract to be created, as described above.

As further shown in FIG. 7, process 700 may include identifying, in the taxonomy and in the knowledge graph, a set of similar contracts that include data similar to the data identifying the new contract (block 745). For example, the device (e.g., using processor 520, memory 530, storage component 540, input component 550, output component 560, communication interface 570, and/or the like) may identify, in the taxonomy and in the knowledge graph, a set of similar contracts that include data similar to the data identifying the new contract, as described above.

As further shown in FIG. 7, process 700 may include determining similarity scores between the data identifying the new contract and data identifying the set of similar contracts (block 750). For example, the device (e.g., using processor 520, memory 530, storage component 540, input component 550, output component 560, communication interface 570, and/or the like) may determine similarity scores between the data identifying the new contract and data identifying the set of similar contracts, as described above.

As further shown in FIG. 7, process 700 may include providing, to the client device, the similarity scores and the data identifying the set of similar contracts (block 755). For example, the device (e.g., using processor 520, memory 530, storage component 540, input component 550, output component 560, communication interface 570, and/or the like) may provide, to the client device, the similarity scores and the data identifying the set of similar contracts, as described above.

Process 700 may include additional implementations, such as any single implementation or any combination of implementations described below and/or in connection with one or more other processes described elsewhere herein.

In a first implementation, the one or more artificial intelligence models include one or more of: a probabilistic model, a hidden Markov model, a maximum entropy model, or a conditional random fields model.

In a second implementation, alone or in combination with the first implementation, process 700 includes receiving a generic knowledge graph; and customizing the generic knowledge graph, based on the nonnumerical noncategorical data in vector format, to create the knowledge graph in vector format.

In a third implementation, alone or in combination with one or more of the first and second implementations, process 700 includes ranking the set of similar contracts based on the similarity scores and to generate a ranked list of similar contracts; and providing the ranked list of similar contracts to the client device.

In a fourth implementation, alone or in combination with one or more of the first through third implementations, process 700 includes ranking the set of similar contracts based on the similarity scores and to generate a ranked list of similar contracts; removing a portion of the similar contracts from the ranked list of similar contracts, based on the ranking and to generate a modified ranked list of similar contracts; and providing the modified ranked list of similar contracts to the client device.

In a fifth implementation, alone or in combination with one or more of the first through fourth implementations, process 700 includes receiving, from the client device, a selection of a similar contract from the data identifying the set of similar contracts; generating one or more terms for the new contract based on the similar contract; and providing data identifying the one or more terms to the client device.

In a sixth implementation, alone or in combination with one or more of the first through fifth implementations, process 700 includes enabling a selection of a similar contract, from the data identifying the set of similar contracts, based on the similarity scores; generating the new contract based on the similar contract; and providing data identifying the new contract to the client device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
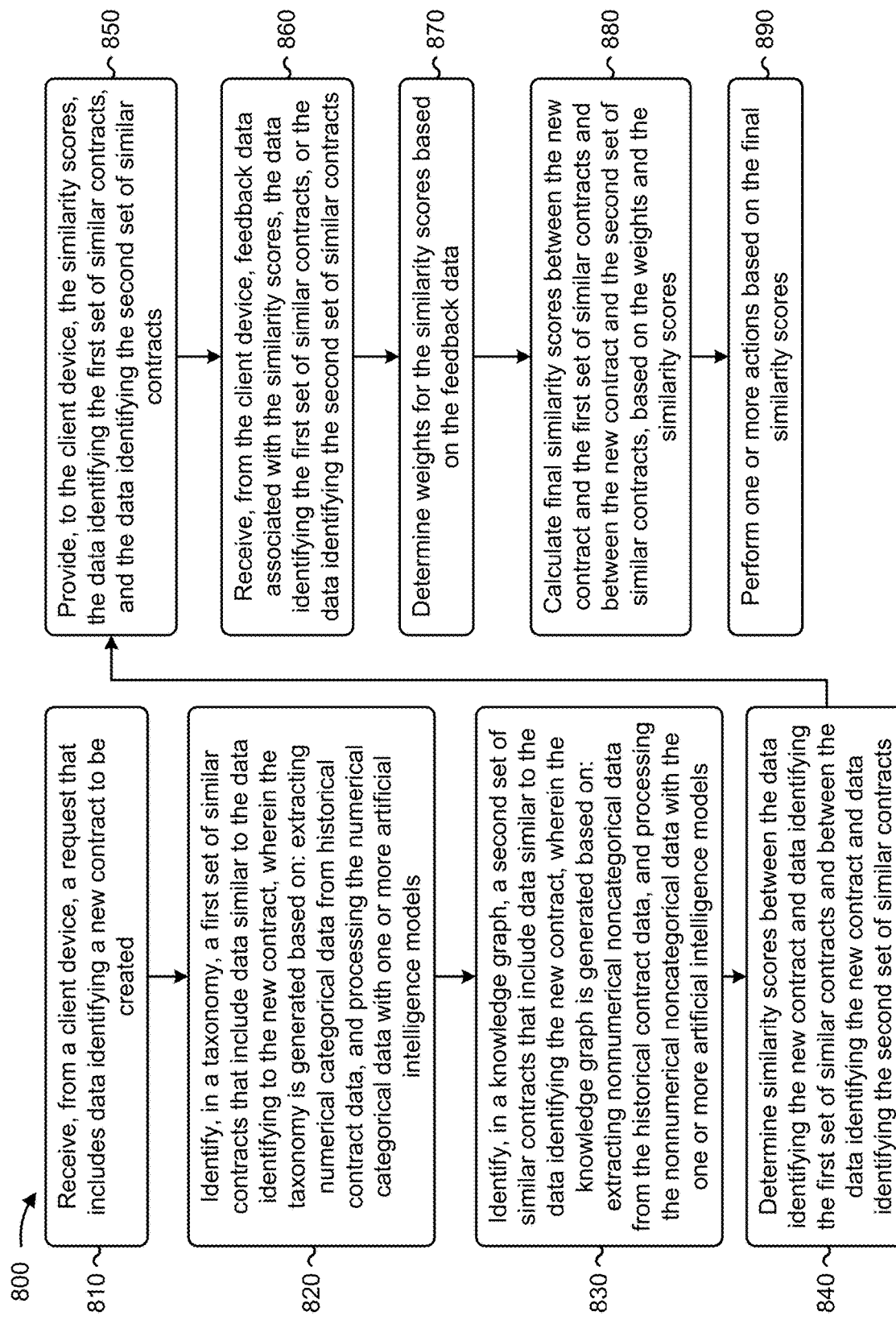

FIG. 8 is a flow chart of an example process 800 associated with a contract platform. In some implementations, one or more process blocks of FIG. 8 may be performed by a device (e.g., contract platform 401). In some implementations, one or more process blocks of FIG. 8 may be performed by another device or a group of devices separate from or including the device, such as a client device (e.g., client device 430), and/or the like.

As shown in FIG. 8, process 800 may include receiving, from a client device, a request that includes data identifying a new contract to be created (block 810). For example, the device (e.g., using processor 520, memory 530, storage component 540, input component 550, output component 560, communication interface 570, and/or the like) may receive, from a client device, a request that includes data identifying a new contract to be created, as described above.

As further shown in FIG. 8, process 800 may include identifying, in a taxonomy, a first set of similar contracts that include data similar to the data identifying to the new contract, wherein the taxonomy is generated based on: reading numerical categorical data from historical contract data, and processing the numerical categorical data with one or more artificial intelligence models (block 820). For example, the device (e.g., using processor 520, memory 530, storage component 540, input component 550, output component 560, communication interface 570, and/or the like) may identify, in a taxonomy, a first set of similar contracts that include data similar to the data identifying to the new contract, as described above. In some implementations, the taxonomy is generated based on.

As further shown in FIG. 8, process 800 may include identifying, in a knowledge graph, a second set of similar contracts that include data similar to the data identifying the new contract, wherein the knowledge graph is generated based on: reading nonnumerical noncategorical data from the historical contract data, and processing the nonnumerical noncategorical data with the one or more artificial intelligence models (block 830). For example, the device (e.g., using processor 520, memory 530, storage component 540, input component 550, output component 560, communication interface 570, and/or the like) may identify, in a knowledge graph, a second set of similar contracts that include data similar to the data identifying the new contract, as described above. In some implementations, the knowledge graph is generated based on.

As further shown in FIG. 8, process 800 may include determining similarity scores between the data identifying the new contract and data identifying the first set of similar contracts and between the data identifying the new contract and data identifying the second set of similar contracts (block 840). For example, the device (e.g., using processor 520, memory 530, storage component 540, input component 550, output component 560, communication interface 570, and/or the like) may determine similarity scores between the data identifying the new contract and data identifying the first set of similar contracts and between the data identifying the new contract and data identifying the second set of similar contracts, as described above.

As further shown in FIG. 8, process 800 may include providing, to the client device, the similarity scores, the data identifying the first set of similar contracts, and the data identifying the second set of similar contracts (block 850). For example, the device (e.g., using processor 520, memory 530, storage component 540, input component 550, output component 560, communication interface 570, and/or the like) may provide, to the client device, the similarity scores, the data identifying the first set of similar contracts, and the data identifying the second set of similar contracts, as described above.

As further shown in FIG. 8, process 800 may include receiving, from the client device, feedback data associated with the similarity scores, the data identifying the first set of similar contracts, or the data identifying the second set of similar contracts (block 860). For example, the device (e.g., using processor 520, memory 530, storage component 540, input component 550, output component 560, communication interface 570, and/or the like) may receive, from the client device, feedback data associated with the similarity scores, the data identifying the first set of similar contracts, or the data identifying the second set of similar contracts, as described above.

As further shown in FIG. 8, process 800 may include determining weights for the similarity scores based on the feedback data (block 870). For example, the device (e.g., using processor 520, memory 530, storage component 540, input component 550, output component 560, communication interface 570, and/or the like) may determine weights for the similarity scores based on the feedback data, as described above.

As further shown in FIG. 8, process 800 may include calculating final similarity scores between the new contract and the first set of similar contracts and between the new contract and the second set of similar contracts, based on the weights and the similarity scores (block 880). For example, the device (e.g., using processor 520, memory 530, storage component 540, input component 550, output component 560, communication interface 570, and/or the like) may calculate final similarity scores between the new contract and the first set of similar contracts and between the new contract and the second set of similar contracts, based on the weights and the similarity scores, as described above.

As further shown in FIG. 8, process 800 may include performing one or more actions based on the final similarity scores (block 890). For example, the device (e.g., using processor 520, memory 530, storage component 540, input component 550, output component 560, communication interface 570, and/or the like) may perform one or more actions based on the final similarity scores, as described above.

Process 800 may include additional implementations, such as any single implementation or any combination of implementations described below and/or in connection with one or more other processes described elsewhere herein.

In a first implementation, process 800 includes processing the data identifying the first set of similar contracts, the data identifying the second set of similar contracts, and the data identifying the new contract, with one or more mathematical models, to determine the similarity scores between the data identifying the new contract and the data identifying the first set of similar contracts and between the data identifying the new contract and the data identifying the second set of similar contracts.

In a second implementation, alone or in combination with the first implementation, the one or more instructions, that cause the one or more processors to perform the one or more actions, cause the one or more processors to one or more of: provide, to the client device, the final similarity scores and data identifying the first set of similar contracts and the second set of similar contracts; enable a selection of a similar contract, from the first set of similar contracts or the second set of similar contracts, based on the final similarity scores; automatically generate the new contract based on the final similarity scores; automatically propose terms and clauses for the new contract based on the final similarity scores; provide, to the client device, a recommendation for a similar contract, from the first set of similar contracts or the second set of similar contracts, based on the final similarity scores; or retrain the one or more artificial intelligence models based on the final similarity scores.

In a third implementation, alone or in combination with one or more of the first and second implementations, process 800 includes ranking the first set of similar contracts and the second set of similar contracts, based on the similarity scores and to generate a ranked list of similar contracts; and providing the ranked list of similar contracts to the client device.

In a fourth implementation, alone or in combination with one or more of the first through third implementations, process 800 includes ranking the first set of similar contracts and the second set of similar contracts, based on the similarity scores and to generate a ranked list of similar contracts; removing a portion of the similar contracts from the ranked list of similar contracts, based on the ranking and to generate a modified ranked list of similar contracts; and providing the modified ranked list of similar contracts to the client device.

In a fifth implementation, alone or in combination with one or more of the first through fourth implementations, process 800 includes receiving, from the client device, a selection of a similar contract from the first set of similar contracts or the second set of similar contracts; generating one or more terms for the new contract based on the similar contract; and providing data identifying the one or more terms to the client device.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, historical contract data;
   reading, by the device and from the historical contract data, numerical categorical data identifying explicit historical contract data;
   processing, by the device, the numerical categorical data, with one or more artificial intelligence models, to convert the numerical categorical data into vector format;
   creating, by the device, a taxonomy in vector format based on the numerical categorical data in vector format;
   reading, by the device and from the historical contract data, nonnumerical noncategorical data identifying implicit historical contract data;
   processing, by the device, the nonnumerical noncategorical data, with one or more artificial intelligence models, to convert the nonnumerical noncategorical data into vector format;
   creating, by the device, a knowledge graph in vector format based on the nonnumerical noncategorical data in vector format;
   receiving, by the device and from a client device, a request that includes data identifying a new contract to be created;
   identifying, by the device and in the taxonomy, a first set of similar contracts that include data similar to the data identifying the new contract;
   identifying, by the device and in the knowledge graph, a second set of similar contracts that include data similar to the data identifying the new contract;
   determining, by the device, similarity scores of a first similarity between the data identifying the new contract and data identifying the first set of similar contracts and a second similarity between the data identifying the new contract and data identifying the second set of similar contracts;
   receiving, from the client device, feedback data associated with a feedback on the similarity scores;
   determining weights for the similarity scores based on the feedback data;
   updating the similarity scores of the first similarity and the second similarity based on the weights to generate the final similarity scores;
   generating, by the device and based on the final similarity scores, a draft of the new contract by modifying particular terms in one or more historical contract clauses from one or more contracts of the first set of similar contracts and the second set of similar contracts,
      wherein generating the draft of the new contract comprises:
         identifying and selecting the one or more historical contract clauses based the particular terms in on the one or more historical contract clauses corresponding to first features meeting a threshold level of match with respect to second features of the new contract and
         generating the draft of the new contracts based on modifying the particular terms in the historical contract clauses to bring the particular terms in conformity with the data identifying the new contract and to generate modified clauses and including the modified clauses in the draft of the new contract; and
   providing, by the device and to the client device, the draft of the new contract and the final similarity scores, the data identifying the first set of similar contracts, and the data identifying the second set of similar contracts.

2. The method of claim 1, where determining the similarity scores comprises:
   processing the data identifying the first set of similar contracts, the data identifying the second set of similar contracts, and the data identifying the new contract, with one or more mathematical models, to determine the similarity scores between the data identifying the new contract and the data identifying the first set of similar contracts and between the data identifying the new contract and the data identifying the second set of similar contracts.

3. The method of claim 2, wherein the one or more mathematical models include one or more of:
   a Euclidian distance model,
   a min-max based normalization model, or
   a cosine similarity model.

4. The method of claim 1, wherein:
   the feedback data is further associated with the data identifying the first set of similar contracts and the data identifying the second set of similar contracts.

5. The method of claim 4, wherein performing the one or more actions comprises one or more of:
   providing, to the client device, the final similarity scores and data identifying the first set of similar contracts and the second set of similar contracts;

enabling selection of a similar contract, from the first set of similar contracts or the second set of similar contracts, based on the final similarity scores; or automatically generating terms for the new contract based on the final similarity scores.

6. The method of claim 4, wherein performing the one or more actions comprises one or more of:

automatically proposing terms and clauses for the new contract based on the final similarity scores;

providing, to the client device, a recommendation for a similar contract, from the first set of similar contracts or the second set of similar contracts, based on the final similarity scores; or retraining the one or more artificial intelligence models based on the final similarity scores.

7. The method of claim 1, wherein the historical contract data is received from an internal data structure and an external data structure, and wherein the historical contract data identifies one or more of historical contracts, historical contract terms, or personnel involved in the historical contracts.

8. A device, comprising:

one or more memories; and one or more processors, communicatively coupled to the one or more memories, configured to:

receive, from an internal data structure and an external data structure, historical contract data identifying one or more of historical contracts, historical contract terms, or personnel involved in the historical contracts;

read, from the historical contract data, numerical categorical data identifying explicit historical contract data;

process the numerical categorical data, with one or more artificial intelligence models, to convert the numerical categorical data into vector format;

generate a taxonomy in vector format based on the numerical categorical data in vector format;

read, from the historical contract data, nonnumerical noncategorical data identifying implicit historical contract data;

process the nonnumerical noncategorical data, with the one or more artificial intelligence models, to convert the nonnumerical noncategorical data into vector format;

generate a knowledge graph in vector format based on the nonnumerical noncategorical data in vector format;

receive, from a client device, a request that includes data identifying a new contract to be created;

identify, in the taxonomy and in the knowledge graph, a set of similar contracts that include data similar to the data identifying the new contract;

determine similarity scores of a first similarity between the data identifying the new contract and data identifying the set of similar contracts and a second similarity between the data identifying the new contract and data identifying the second set of similar contracts;

receive, from the client device, feedback data associated with a feedback on the similarity scores;

determine weights for the similarity scores based on the feedback data;

update the similarity scores of the first similarity and the second similarity based on the weights to generate the final similarity scores;

generate, based on the final similarity scores, a draft of the new contract by modifying particular terms in one or more historical contract clauses from one or more contracts of the set of similar contracts, wherein the one or more processors, to generate the draft of the new contract, are configured to:

identify and select the one or more historical contract clauses based on the particular terms in the one or more historical contract clauses corresponding to first features meeting a threshold level of match with respect to second features of the new contract, and generate the draft of the new contract based on modifying the particular terms in the historical contract clauses to bring the particular terms in conformity with the data identifying the new contract, and to generate modified clauses and including the modified clauses in the draft of the new contract; and provide, to the client device, the draft of the new contract and the final similarity scores and the data identifying the set of similar contracts.

9. The device of claim 8, wherein the one or more artificial intelligence models include one or more of:

a probabilistic model, a hidden Markov model, a maximum entropy model, or a conditional random fields model.

10. The device of claim 8, wherein the one or more processors, when creating the knowledge graph in vector format, are configured to:

receive a generic knowledge graph; and customize the generic knowledge graph, based on the nonnumerical noncategorical data in vector format, to create the knowledge graph in vector format.

11. The device of claim 8, wherein the one or more processors, when providing, to the client device, the similarity scores and the data identifying the set of similar contracts, are configured to:

rank the set of similar contracts based on the similarity scores and to generate a ranked list of similar contracts; and provide the ranked list of similar contracts to the client device.

12. The device of claim 8, wherein the one or more processors, when providing, to the client device, the similarity scores and the data identifying the set of similar contracts, are configured to:

rank the set of similar contracts based on the similarity scores and to generate a ranked list of similar contracts;

remove a portion of the similar contracts from the ranked list of similar contracts, based on the ranking and to generate a modified ranked list of similar contracts; and provide the modified ranked list of similar contracts to the client device.

13. The device of claim 8, wherein the one or more processors are further configured to:

receive, from the client device, a selection of a similar contract from the data identifying the set of similar contracts;

generate one or more terms for the new contract based on the similar contract; and provide data identifying the one or more terms to the client device.

14. The device of claim 8, wherein the one or more processors are further configured to:

enable a selection of a similar contract, from the data identifying the set of similar contracts, based on the similarity scores;

generate the new contract based on the similar contract; and provide data identifying the new contract to the client device.

15. A non-transitory computer-readable medium storing instructions, the instructions comprising:

one or more instructions that, when executed by one or more processors, cause the one or more processors to:

receive, from a client device, a request that includes data identifying a new contract to be created;

identify, in a taxonomy, a first set of similar contracts that include data similar to the data identifying to the new contract, wherein the taxonomy is generated based on:

reading numerical categorical data from historical contract data, and processing the numerical categorical data with one or more artificial intelligence models;

identify, in a knowledge graph, a second set of similar contracts that include data similar to the data identifying the new contract, wherein the knowledge graph is generated based on:

reading nonnumerical noncategorical data from the historical contract data, and processing the nonnumerical noncategorical data with the one or more artificial intelligence models;

determine similarity scores of a first similarity between the data identifying the new contract and data identifying the first set of similar contracts and a second similarity between the data identifying the new contract and data identifying the second set of similar contracts;

receive, from the client device, feedback data associated with a feedback on the similarity scores;

determine weights for the similarity scores based on the feedback data;

update the similarity scores of the first similarity and the second similarity based on the weights to generate the final similarity scores;

provide, to the client device, based on the final similarity scores, the data identifying the first set of similar contracts, and the data identifying the second set of similar contracts;

receive, from the client device, feedback data associated with the similarity scores, the data identifying the first set of similar contracts, or the data identifying the second set of similar contracts;

determine weights for the similarity scores based on the feedback data;

calculate final similarity scores between the new contract and the first set of similar contracts and between the new contract and the second set of similar contracts, based on the weights and the similarity scores;

generate a draft of the new contract based on modifying particular terms in one or more historical contract clauses from one or more contracts of the first set of similar contracts and the second set of similar contracts, wherein the one or more instructions, that cause the one or more processors to generate the draft of the new contract, cause the one or more processors to:

identify and select the one or more historical contract clauses based on the particular terms in the one or more historical contract clauses corresponding to first features meeting a threshold level of match with respect to second features of the new contract, and generate the draft of the new contract based on modifying the particular terms in the historical contract clauses to bring the particular terms in conformity with the data identifying the new contract, and to generate modified clauses and including the modified clauses in the draft of the new contract; and perform one or more actions based on the final similarity scores.

16. The non-transitory computer-readable medium of claim 15, where the one or more instructions, that cause the one or more processors to determine the similarity scores, cause the one or more processors to:

process the data identifying the first set of similar contracts, the data identifying the second set of similar contracts, and the data identifying the new contract, with one or more mathematical models, to determine the similarity scores between the data identifying the new contract and the data identifying the first set of similar contracts and between the data identifying the new contract and the data identifying the second set of similar contracts.

17. The non-transitory computer-readable medium of claim 15, wherein the one or more instructions, that cause the one or more processors to perform the one or more actions, cause the one or more processors to one or more of:

provide, to the client device, the final similarity scores and data identifying the first set of similar contracts and the second set of similar contracts;

enable a selection of a similar contract, from the first set of similar contracts or the second set of similar contracts, based on the final similarity scores;

automatically generate the new contract based on the final similarity scores;

automatically propose terms and clauses for the new contract based on the final similarity scores;

provide, to the client device, a recommendation for a similar contract, from the first set of similar contracts or the second set of similar contracts, based on the final similarity scores; or retrain the one or more artificial intelligence models based on the final similarity scores.

18. The non-transitory computer-readable medium of claim 15, wherein the one or more instructions, that cause the one or more processors to provide, to the client device, the similarity scores and the data identifying the first set of similar contracts and the second set of similar contracts, cause the one or more processors to:

rank the first set of similar contracts and the second set of similar contracts, based on the similarity scores and to generate a ranked list of similar contracts; and provide the ranked list of similar contracts to the client device.

19. The non-transitory computer-readable medium of claim 15, wherein the one or more instructions, that cause the one or more processors to provide, to the client device, the similarity scores and the data identifying the first set of similar contracts and the second set of similar contracts, cause the one or more processors to:

rank the first set of similar contracts and the second set of similar contracts, based on the similarity scores and to generate a ranked list of similar contracts;

remove a portion of the similar contracts from the ranked list of similar contracts, based on the ranking and to generate a modified ranked list of similar contracts; and provide the modified ranked list of similar contracts to the client device.

20. The non-transitory computer-readable medium of claim 15, wherein the one or more instructions, that cause the one or more processors to perform the one or more actions, cause the one or more processors to:

receive, from the client device, a selection of a similar contract from the first set of similar contracts or the second set of similar contracts;

generate one or more terms for the new contract based on the similar contract; and provide data identifying the one or more terms to the client device.

\* \* \* \* \*